(12) United States Patent
Jung et al.

(10) Patent No.: US 8,115,893 B2
(45) Date of Patent: Feb. 14, 2012

(54) LIQUID CRYSTAL DISPLAY DEVICE WITH REFLECTION AND TRANSMISSION REGIONS

(75) Inventors: Tae Yong Jung, Gyeongsangbuk-do (KR); Ji No Lee, Gyeonggi-do (KR); Hee Young Kwack, Seoul (KR)

(73) Assignee: LG Display Co., Ltd., Seoul (KR)

( * ) Notice: Subject to any disclaimer, the term of this patent is extended or adjusted under 35 U.S.C. 154(b) by 515 days.

(21) Appl. No.: 12/000,746

(22) Filed: Dec. 17, 2007

(65) Prior Publication Data

US 2008/0094534 A1    Apr. 24, 2008

Related U.S. Application Data

(62) Division of application No. 11/143,587, filed on Jun. 3, 2005, now Pat. No. 7,312,843.

(30) Foreign Application Priority Data

Jun. 5, 2004   (KR) .............................. 10-2004-41136

(51) Int. Cl.
*G02F 1/1335*    (2006.01)
(52) U.S. Cl. ........................................ 349/114; 349/113
(58) Field of Classification Search ........... 349/113–114
See application file for complete search history.

(56) References Cited

U.S. PATENT DOCUMENTS

| | | |
|---|---|---|
| 5,162,933 A | 11/1992 | Kakuda et al. |
| 5,339,181 A | 8/1994 | Kim et al. |
| 5,668,379 A | 9/1997 | Ono et al. |
| 5,771,083 A | 6/1998 | Fujihara et al. |
| 5,847,781 A | 12/1998 | Ono et al. |
| 6,372,560 B1 | 4/2002 | Jen et al. |
| 6,744,486 B2 | 6/2004 | Kim et al. |
| 6,927,817 B2 | 8/2005 | Itoh et al. |
| 7,064,799 B2 | 6/2006 | Okamoto et al. |
| 0,066,868 A1 | 3/2009 | Kim et al. |
| 2003/0016322 A1* | 1/2003 | Ha et al. ........................ 349/113 |
| 2003/0071944 A1 | 4/2003 | Baek |
| 2003/0103178 A1* | 6/2003 | Sakamoto et al. ............. 349/113 |
| 2003/0133054 A1* | 7/2003 | Taguchi et al. ................. 349/38 |

(Continued)

FOREIGN PATENT DOCUMENTS

| | | |
|---|---|---|
| KR | 10-2001-0025955 | 4/2001 |
| KR | 10-2004-0031369 | 4/2004 |
| KR | 10-2004-0012445 | 11/2004 |

*Primary Examiner* — Jessica M Merlin
(74) *Attorney, Agent, or Firm* — Morgan, Lewis & Bockius LLP

(57) ABSTRACT

A liquid crystal display device includes a first substrate, a second substrate and a liquid crystal layer between the first and second substrates. The liquid crystal display device further includes a gate line on the first substrate, a first insulation film on the gate line, a data line crossing the gate line such that the data line and the gate line define a pixel region with a transmission area and a reflection area, a thin film transistor connected to the gate line and the data line, a storage capacitor including a storage line crossing the data line and an upper storage electrode connected to the thin film transistor, a second insulation film on the thin film transistor with a transmission hole defined through the second insulation film, a reflection electrode disposed on the second insulation film in the reflection area and connected to a portion of the upper storage electrode through the transmission hole, and a pixel electrode disposed in the pixel region and connected to the reflection electrode.

13 Claims, 28 Drawing Sheets

U.S. PATENT DOCUMENTS

| | | |
|---|---|---|
| 2003/0133059 A1* | 7/2003 | Wei et al. .................. 349/113 |
| 2003/0160921 A1* | 8/2003 | Nakashima et al. .......... 349/113 |
| 2004/0021813 A1* | 2/2004 | Kim et al. .................. 349/113 |
| 2005/0270451 A1 | 12/2005 | Ahn |
| 2006/0033868 A1 | 2/2006 | Yang et al. |
| 2006/0238676 A1* | 10/2006 | Yang et al. .................. 349/114 |

* cited by examiner

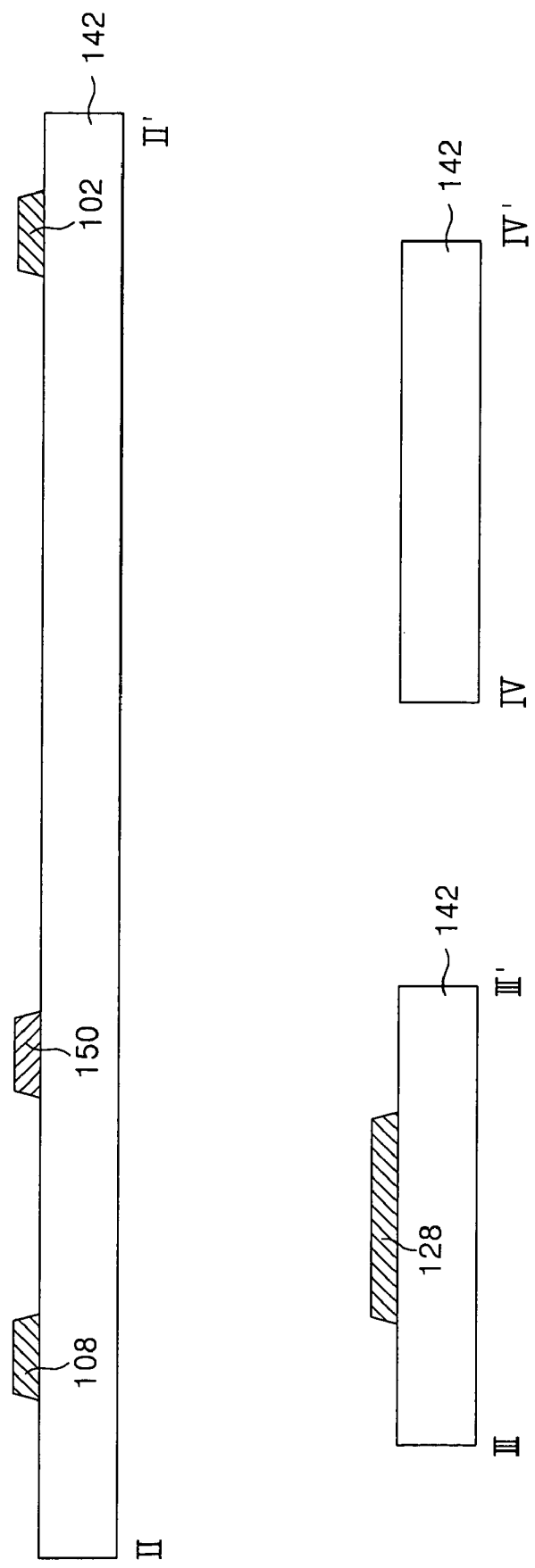

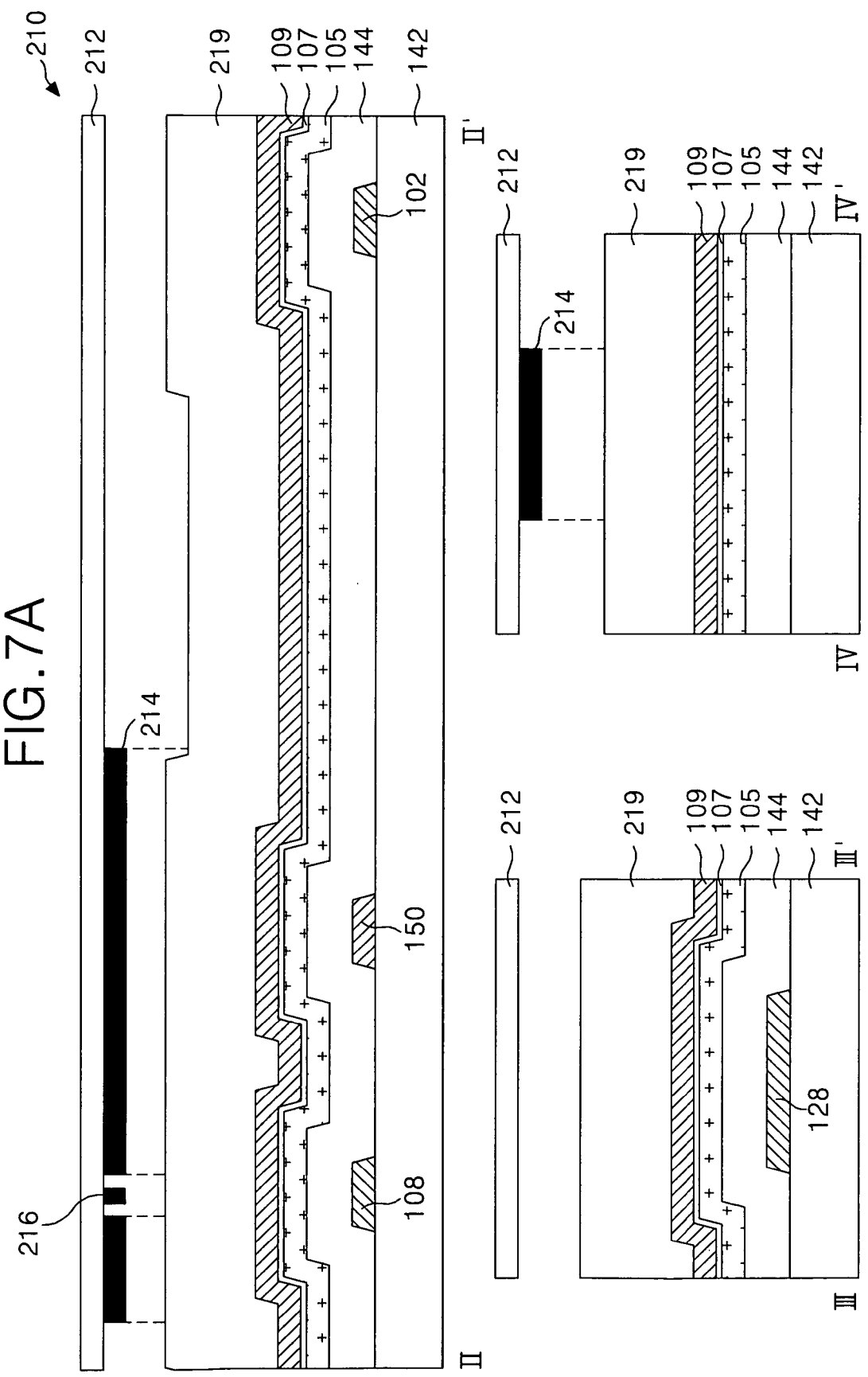

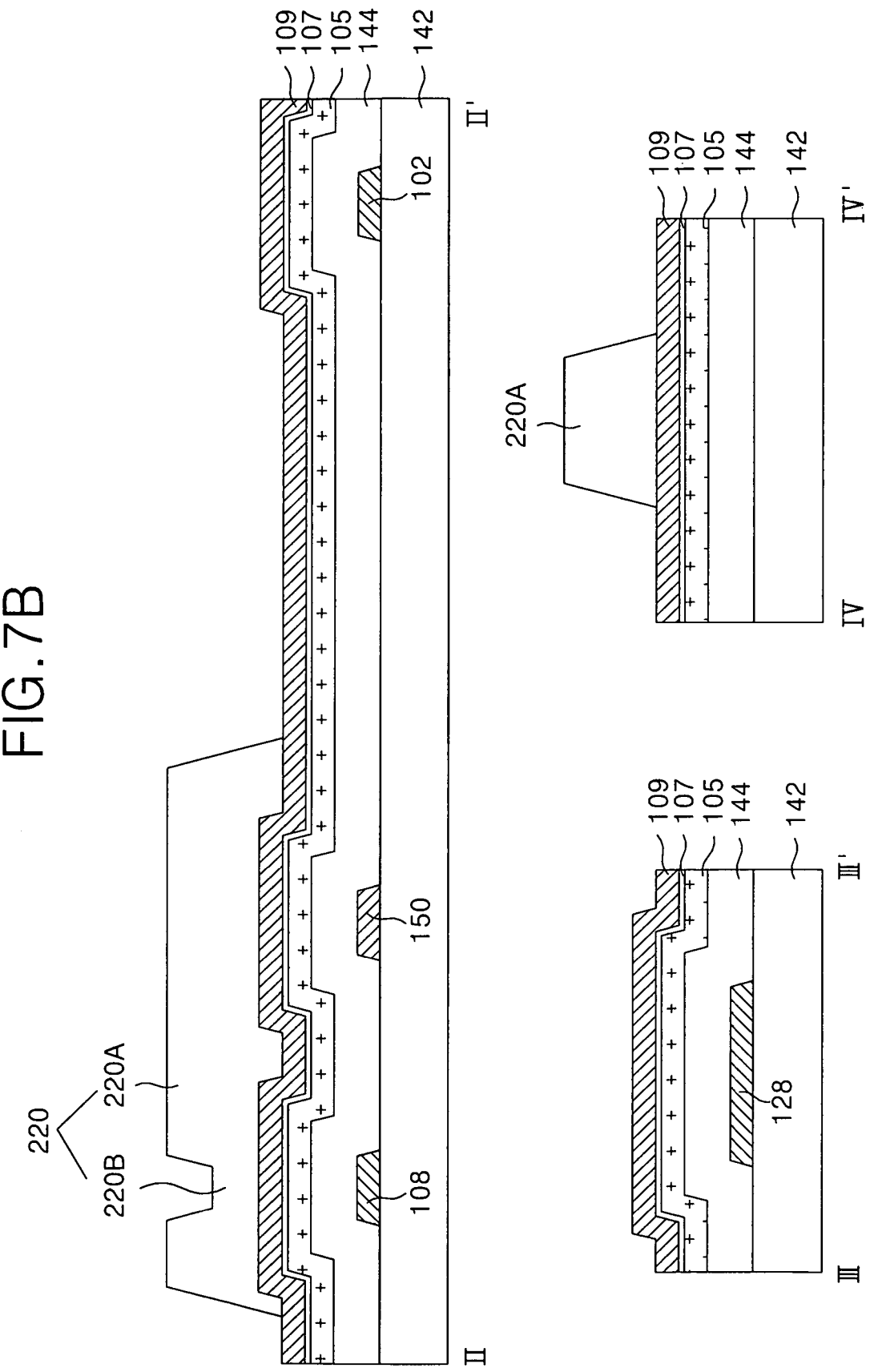

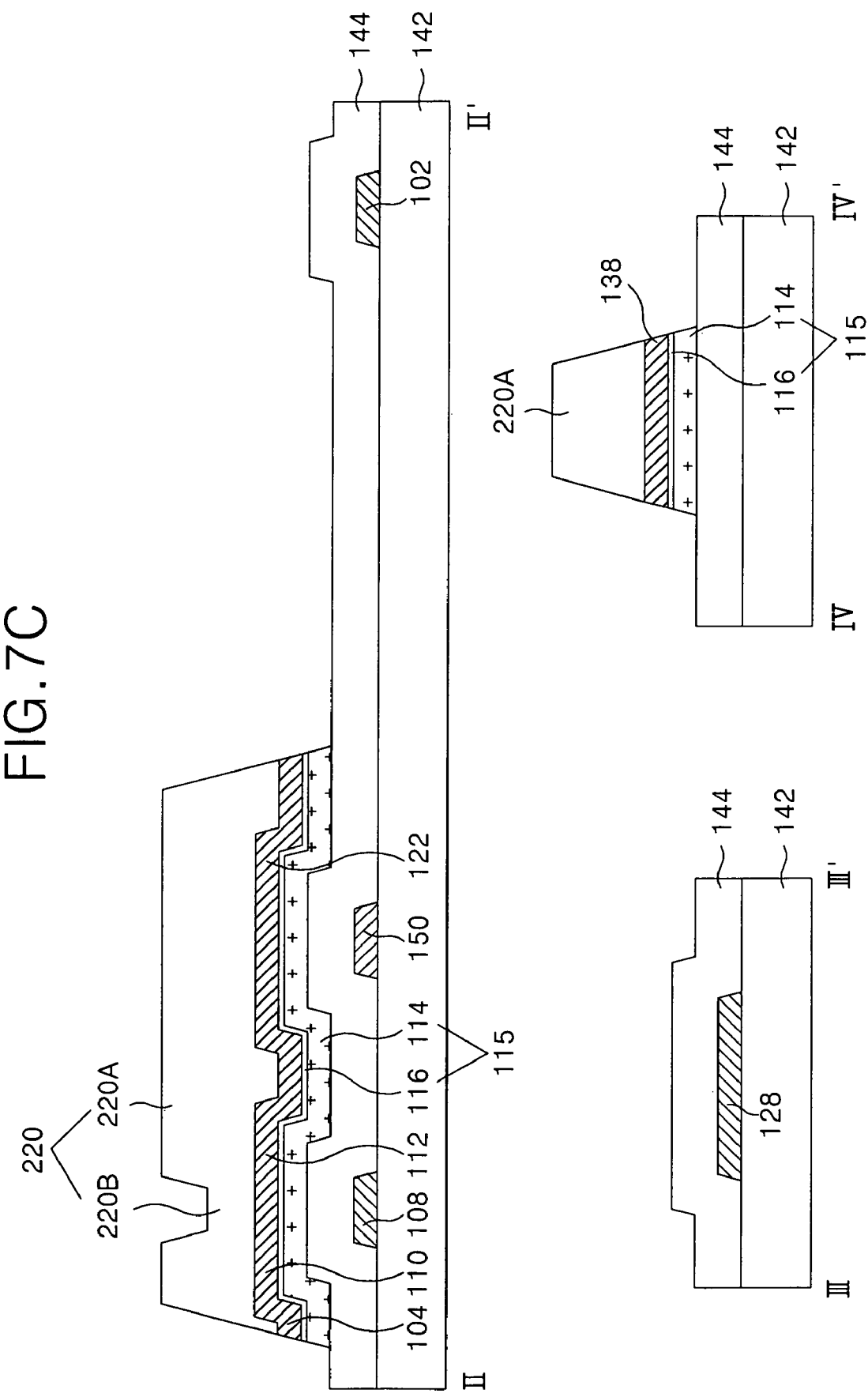

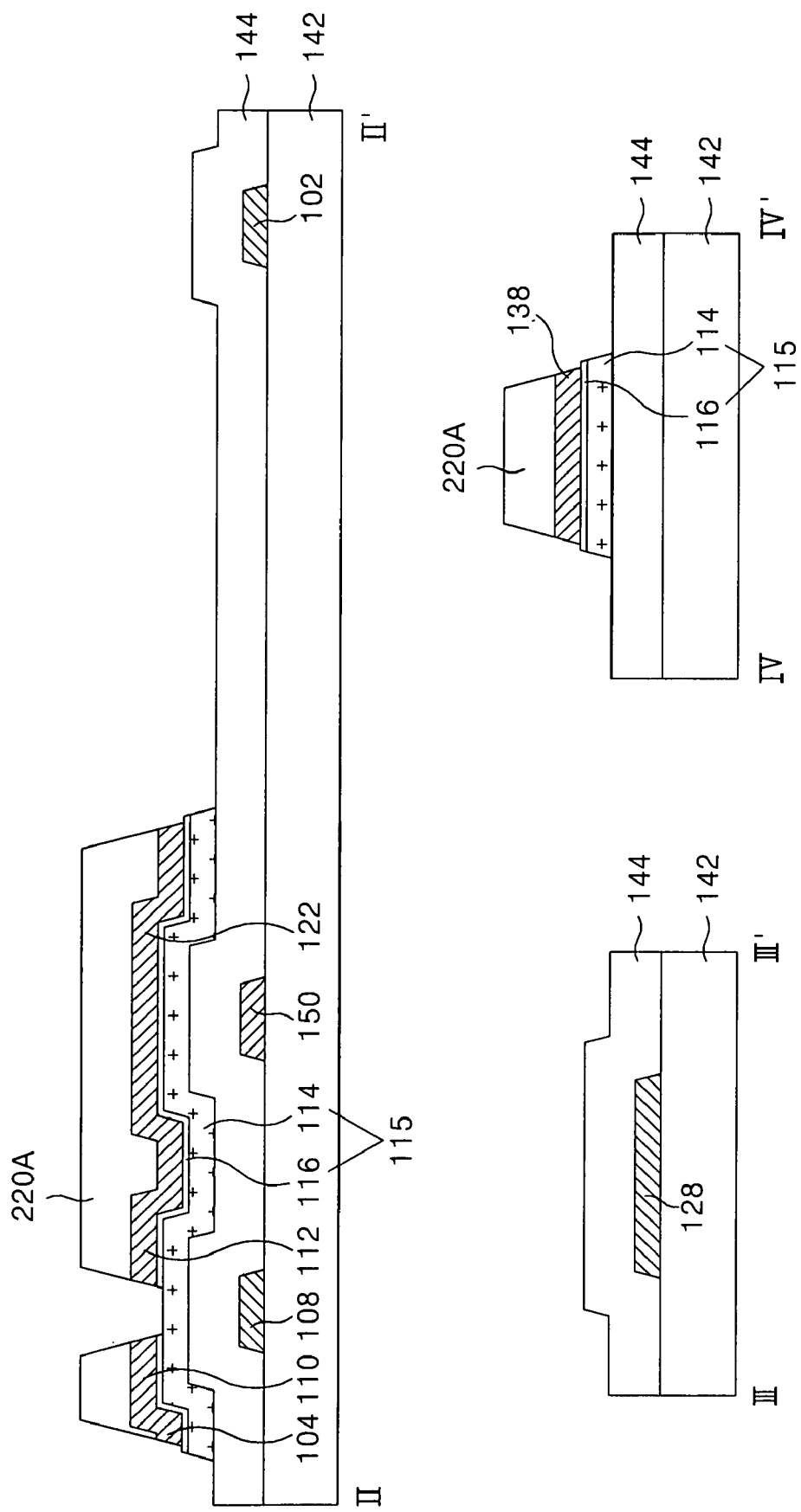

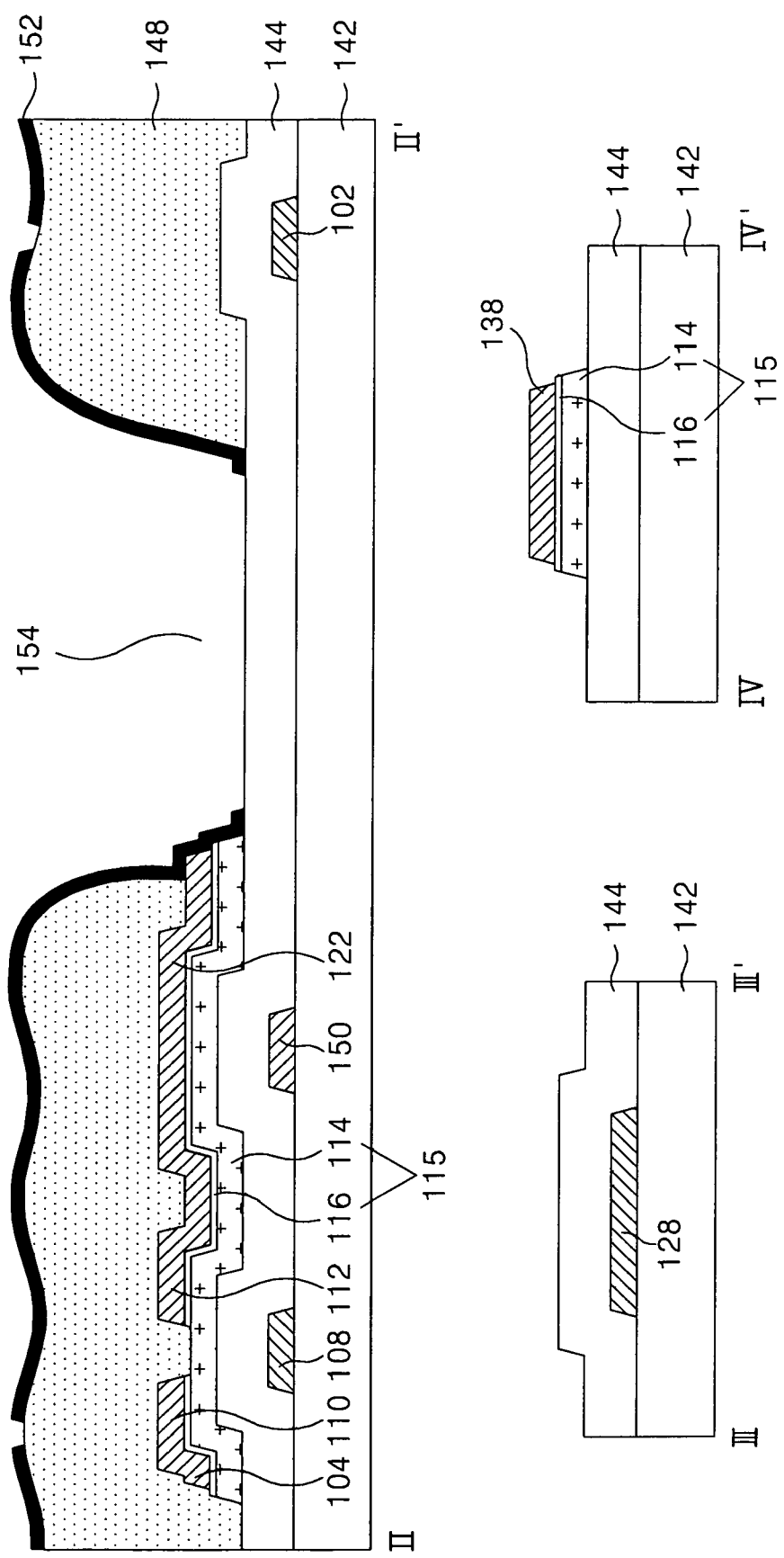

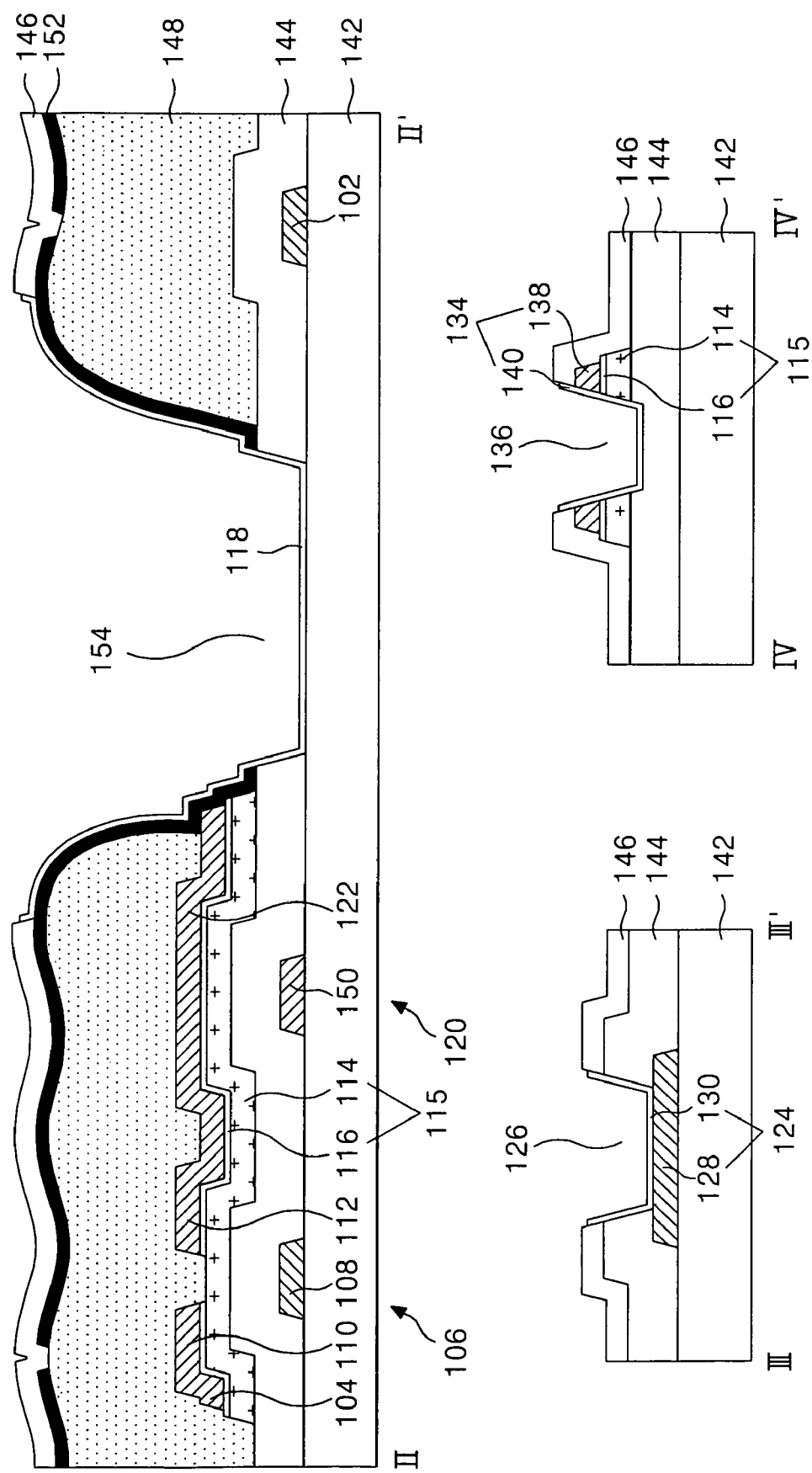

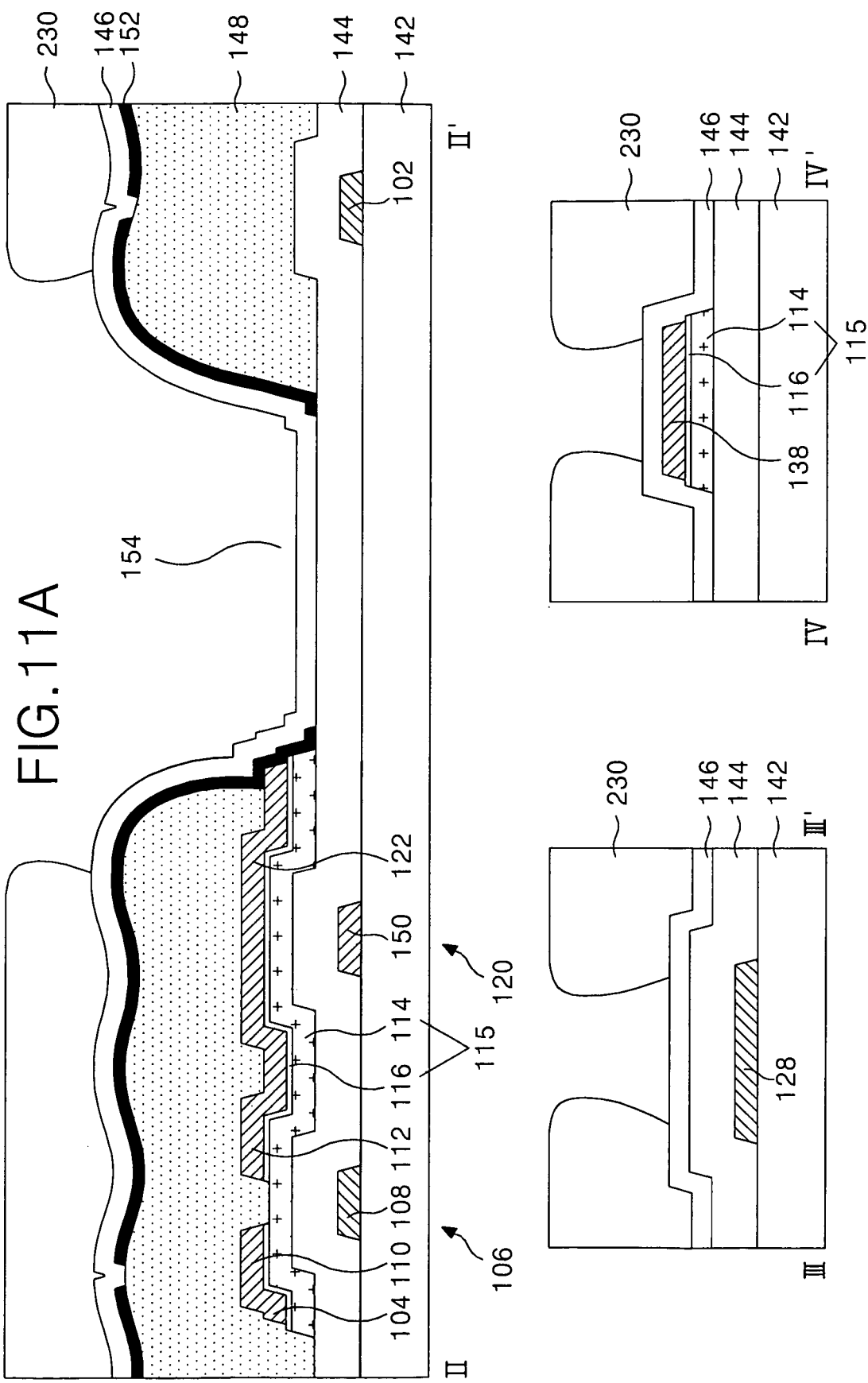

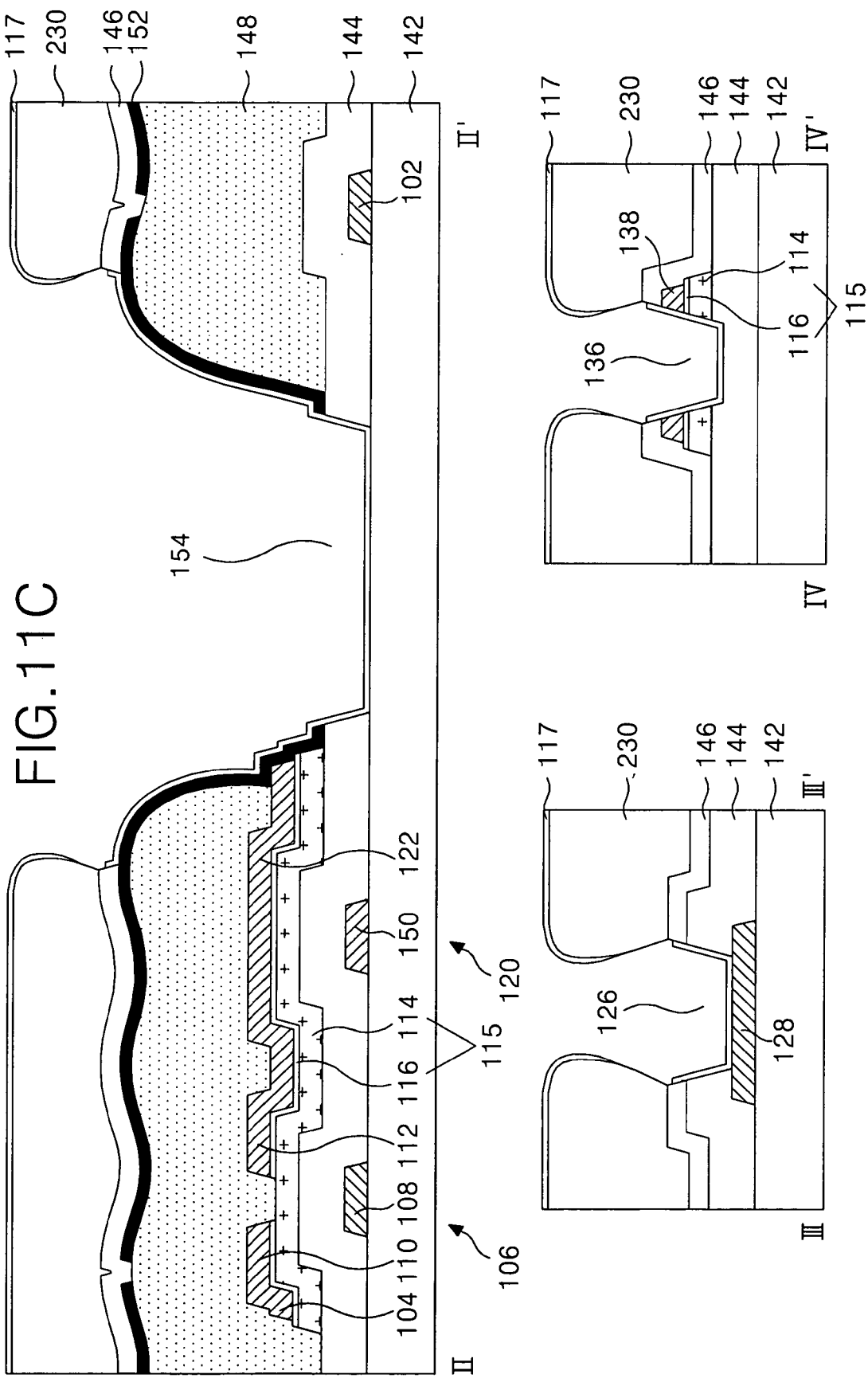

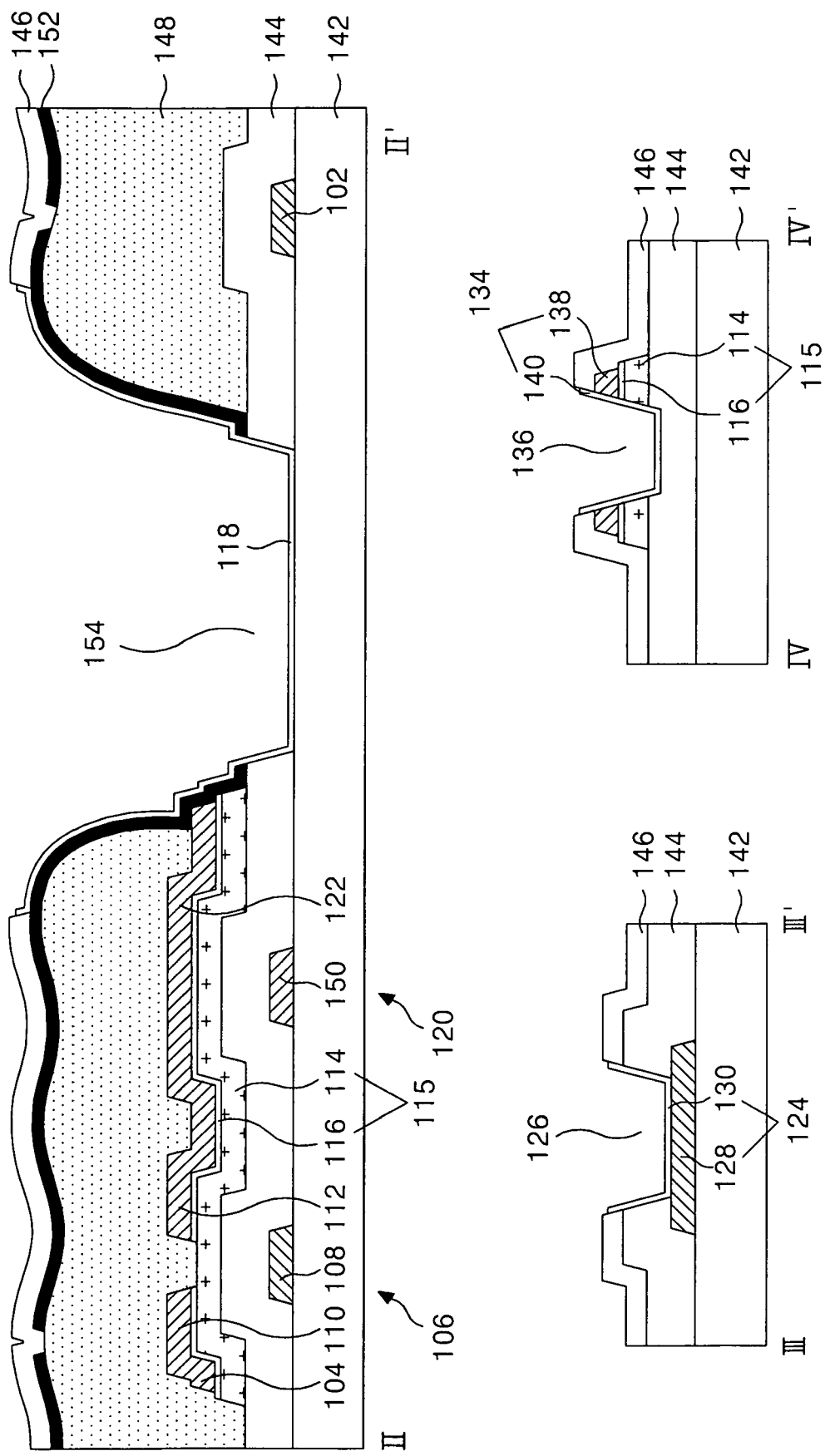

LIQUID CRYSTAL DISPLAY DEVICE WITH REFLECTION AND TRANSMISSION REGIONS

This is a divisional application of U.S. patent application Ser. No. 11/143,587, filed Jun. 3, 2005 now U.S. Pat. No. 7,312,843, and further claims the benefit of the Korean Patent Application No. P2004-41136 filed in Korea on Jun. 5, 2004, both of which are hereby incorporated by reference.

BACKGROUND OF THE INVENTION

1. Field of the Invention

The present invention relates to a liquid crystal display device, and more particularly, to a transflective thin film transistor substrate and method of fabricating the same.

2. Description of the Related Art

Liquid crystal display devices are generally classified into a transmissive type where a picture is displayed using light incident from a backlight unit, and a reflective type where a picture is displayed by reflecting external light such as a natural light. However, the power consumption of the backlight unit is high in the transmissive type, and the reflective type depends on the external light so that it cannot display a picture in a dark environment.

To resolve this problem, a transflective liquid crystal display device is increasingly being used, wherein the transflective liquid crystal can be selected to be in a transmissive mode where the backlight unit is used or in a reflective mode where the external light is used. The transflective liquid crystal display device operates in the reflective mode if the external light is sufficient and in the transmissive mode if the external light is not sufficient, thereby reducing the power consumption more than the transmissive liquid crystal display device but not being restricted by external light levels unlike the reflective liquid crystal display device.

Generally, a transflective liquid crystal display panel of the related art, as shown in FIG. 1, includes a color filter substrate and a thin film transistor substrate which are bonded together with a liquid crystal layer (not shown), and a backlight unit 60 arranged behind the thin film transistor substrate. Each pixel of the transflective liquid crystal display panel is divided into a reflective area where a reflective electrode 28 is formed, and a transmissive area where the reflective electrode 28 is not formed.

The color filter substrate includes an upper substrate 52, a black matrix (not shown), a color filter 54 formed on the upper substrate 52, a common electrode 56, and an alignment film (not shown) formed thereover. The thin film transistor substrate includes a lower substrate 2, a gate line 4, a data line (not shown) formed on the lower substrate 2 crossing the gate line 4 to define each pixel area, a thin film transistor connected to the gate line 4 and the data line, a pixel electrode 32 formed at the pixel area and connected to the thin film transistor; and a reflection electrode 28 formed at a reflection area of each pixel to overlap the pixel electrode.

The thin film transistor includes a gate electrode 6 connected to the gate line 4; a source electrode 16 connected to the data line; a drain electrode 18 facing the source electrode 16; an active layer 10 overlapping the gate electrode 6 with a gate insulating film 8 therebetween to form a channel between the source and drain electrodes 16 and 18; and an ohmic contact layer 12 to make an ohmic contact with the active layer 10, the source electrode 16, and the drain electrode 18. The thin film transistor responds to the scan signal of the gate line 4, thereby causing a video signal on the data line to be charged and maintained on the pixel electrode 32.

The reflection electrode 28 reflects an external light that is incident through a color filter substrate toward the color filter substrate. At this moment, the surface of an organic film 24 formed under the reflection electrode 28 has an embossing shape, and the reflection electrode 28 on top of the organic film 24 also has the embossing shape, thereby increasing its reflection efficiency due to its dispersion effect.

The pixel electrode 32 is connected via an upper storage electrode 20 to the drain electrode of the thin film transistor, and the pixel electrode 32 generates a potential difference with a common electrode 56 by the pixel signal supplied through the thin film transistor. The potential difference causes liquid crystal molecules having dielectric anisotropy to rotate, thereby controlling the transmissivity of the light that passes through a liquid crystal layer of each of the reflection area and a transmission area, and changing its brightness in accordance with the video signal.

In this case, a transmission hole 36 is formed in the relatively thick organic film 24 at a transmission area so that the length of the light path going through the liquid crystal layer is the same in the reflection area as in the transmission area. As a result, a path that ambient light incident at the reflection area, i.e., a reflection light RL, goes through the liquid crystal layer, then through the reflection electrode 28, and then through the liquid crystal layer in the liquid crystal layer is the same in length as a path that the transmission light TL of a backlight unit 60, which is incident at the transmission area going through the liquid crystal layer. Thus, the transmission efficiency becomes the same in both of the reflection mode and the transmission mode.

The thin film transistor substrate further includes a storage capacitor connected to the pixel electrode 32 to maintain the video signal supplied to the pixel electrode 32 stable. The storage capacitor is formed with an upper storage electrode 20 overlapping a storage line 40 with a gate insulating film 8 therebetween. Here, wherein the upper storage electrode 20 is extended from the drain electrode 18 to connect to the pixel electrode 32 via a contact hole 34. The ohmic contact layer 12 and the active layer 10 further overlap under the upper storage electrode 20 in the process.

The thin film transistor substrate further includes a first passivation film 22 between the thin film transistor and the organic film 24; a second passivation film 26 between the organic film 24 and the reflection electrode 28; and a third passivation film 30 between the reflection electrode 28 and the pixel electrode 32. Accordingly, the contact hole 34 penetrates the first to the third passivation films 22, 26 and 30, the organic film 24 and the reflection electrode 28 so that the pixel electrode 32 is connected to the upper storage electrode 20.

In such a transflective liquid crystal display panel, the thin film transistor substrate includes the semiconductor process and requires a plurality of mask processes. Thus, its manufacturing process is complicated so that it significantly increases the liquid crystal display panel manufacturing cost.

Hereinafter, a fabricating method of the transflective thin film transistor substrate according to the related art will be described in reference with FIGS. 2A to 2F. As shown in FIG. 2A, in a first mask process, a gate pattern including the gate line 4, the gate electrode 6, and the storage line 40 is formed on the lower substrate 2.

A gate metal layer is formed on the lower substrate 2 by a deposition method such as sputtering. Subsequently, the gate metal layer is patterned by a photolithography process using a first mask and an etching process, thereby forming the gate pattern including the gate line 4, the gate electrode 6, and the storage line 40. The gate metal layer is a single layered or double layered metal, such as Al, Mo, or Cr.

As shown in FIG. 2B, the gate insulating film 8 is formed on the substrate 2 having the gate pattern. On the substrate 2 having the gate insulating film 8, a semiconductor pattern having the active layer 10 and the ohmic contact layer 12 formed, and a source/drain pattern having the data line, the source electrode 16, the drain electrode 18 and the upper storage electrode 20 are stacked by the second mask process.

The gate insulating film 8, an amorphous silicon layer, an amorphous silicon layer with impurities doped thereto, and the source/drain metal layer are sequentially formed on the lower substrate 2 where the gate pattern is formed. The gate insulating film 8 is formed of an inorganic insulating material such as silicon oxide SiOx or silicon nitride SiNx, and the source/drain metal layer is the single layered or double layered structure of the metal such as Al, Mo or the like.

A photoresist pattern is formed on top of the source/drain metal layer by a photolithography process using a second mask. In this case, a diffractive exposure mask having a diffractive exposure portion at a channel of the thin film transistor is used as the second mask. Thus, the photoresist pattern of the channel has a lower height than the source/drain pattern portion. Subsequently, the source/drain metal layer is patterned by a wet etching process using the photoresist pattern to form the source/drain pattern that includes the data line, the source electrode 16, the drain electrode 18 integrated with the source electrode 16, and the storage electrode 20. Then, the amorphous silicon layer doped with the impurities and the amorphous silicon layer are simultaneously patterned by a dry etching process using the same photoresist pattern, thereby forming the ohmic contact layer 12 and the active layer 10. After removing the photoresist pattern having relatively low height at the channel by an ashing process, the source/drain pattern and the ohmic contact layer 12 of the channel are etched by a dry etching process. Accordingly, the active layer 10 of the channel is exposed to separate the source electrode 16 from the drain electrode 18. Subsequently, the photoresist pattern remaining on the source/drain pattern is removed by a stripping process.

As shown in FIG. 2C, a first passivation film 22 is formed on the gate insulating film 8 where the source/drain pattern is formed, and an organic film 24 is formed on top thereof by a third mask process. Here, the organic film 24 has a contact hole 34 and a transmission hole 36 with the embossing shaped surface.

The first passivation film 22 and the organic film 24 are sequentially formed on the gate insulating film 8 where the source/drain pattern is formed. The first passivation film 22 is formed of the same inorganic insulating material as the gate insulating film 8, and the organic film 24 is of a photosensitive organic material, such as an acrylic resin.

Then, the organic film 24 is patterned by a photolithography process using the third mask, thereby forming an open hole 35 and the transmission hole 36 which penetrate the organic film 24 in correspondence to the transmission portion of the third mask. At this moment, the third mask has a structure where a shielding portion and a diffractive exposure portion repeat at the rest area except for the transmission portion. The organic film 24 remaining in correspondence thereto is patterned to have a structure that a shielding area (projected portion) and a diffractive exposure area (groove portion) having a stepped difference are repeated. Subsequently, the organic film 24 where the projected portion and the groove portion are repeated is fired so that the surface of the organic film 24 has the embossing shape.

As shown in FIG. 2D, a second passivation film 26 is formed on the organic film 24 that has the embossing shape, and the reflection electrode 28 is formed on top thereof by a fourth mask process. The second passivation film 26 and the reflective metal layer are deposited to maintain their embossing shape on top of the organic film 24 that has the embossing surface. The second passivation film 26 is formed of an inorganic insulating material such as the first passivation film 22, and the reflective metal layer is formed of a metal such as AlNd or the like, of which the reflectivity is high. Subsequently, the reflective metal layer is patterned by a photolithography process using a fourth mask and the etching process to form the reflection electrode 28. Here, the reflection electrode is independent of every pixel and is opened at the transmission hole 36 and the open hole 35 of the organic film 24.

As shown in FIG. 2E, a third passivation film 30 covering the reflection electrode 28 is formed by a fifth mask process, and the contact hole 34 penetrating the first to third passivation films 22, 26, 30 is formed. The third passivation film 30 covering the reflection electrode 28 is formed and the contact hole 34 is formed by a photolithography process using a fifth mask and the etching process. Here, the contact hole 34 penetrates the first to third passivation films 22, 26, 30 at the open hole 35 of the organic film 24. The contact hole 34 exposes the drain electrode 18 and the upper storage electrode 20. The third passivation film 30 is formed of the same inorganic insulating material as the second passivation film 26.

As shown in FIG. 2F, a pixel electrode 32 is formed on the third passivation film 30 using a sixth mask process. A transparent conductive layer is formed on the third passivation film 30 by the deposition method such as sputtering, and the transparent conductive layer is patterned by a photolithography process using a sixth mask and the etching process to form the pixel electrode 32 at each pixel area. The pixel electrode 32 is connected to the upper storage electrode 20 through the contact hole 34. The transparent conductive layer is formed of indium-tin-oxide ITO.

In this way, the related art transflective thin film transistor substrate is formed by six mask processes, thereby complicating its manufacturing process is complicated.

SUMMARY OF THE INVENTION

Accordingly, the present invention is directed to a liquid crystal display device and fabricating method thereof that substantially obviates one or more of the problems due to limitations and disadvantages of the related art.

An object of the present invention to provide a transflective thin film transistor substrate and a method of fabricating the same with a simplified process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device comprises a first substrate a gate line on the first substrate; a first insulation film on the gate line; a data line crossing the gate line such that the data line and the gate line define a pixel region with a transmission area and a reflection area; a thin film transistor connected to the gate line and the data line; a storage capacitor including a storage line crossing the data line, and an upper storage electrode being connected to the thin film transistor and overlapping the storage line; a second insulation film on the thin film transistor, a transmission hole being defined through the second insulation film; a reflection electrode disposed on the second insulation film in the reflection area and connected to a portion of the upper storage electrode through the transmission hole; a pixel electrode disposed in the pixel region and connected to the reflection electrode; a second substrate facing the first substrate; and a liquid crystal layer disposed between the first and second substrates.

In another aspect, a method of fabricating a liquid crystal display device comprises forming a gate pattern on a first substrate using a first mask, the gate pattern including a gate line, a gate electrode connected to the gate line, and a storage line; forming a first insulation film on the gate pattern, a semiconductor pattern on the first insulation film, and a source/drain pattern having a data line, a source electrode, a drain electrode, and an upper storage electrode using a second mask, the data and gate lines crossing each other to define a pixel region with a transmission area and a reflection area; forming a second insulation film on the source/drain pattern using a third mask, the second insulation film defining a transmission hole through the second insulation film; forming a reflection electrode in the reflection area using a fourth mask, the reflection electrode being connected to a portion of the upper storage electrode through the transmission hole; forming a third insulation film on the reflection electrode and a pixel electrode using a fifth mask, the pixel electrode being connected to the reflection electrode; and joining the first substrate with a second substrate and disposing a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5A and 5B are a plane view and a sectional view describing a first mask process of the transflective thin film transistor substrate according to the present invention;

FIGS. 7A and 7E are sectional views describing a second mask process according to the present invention;

FIGS. 9A and 9B are a plane view and a sectional view describing a fourth mask process of the transflective thin film transistor substrate according to the present invention;

FIGS. 10A and 10B are a plane view and a sectional view describing a fifth mask process of the transflective thin film transistor substrate according to the present invention.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiment of the present invention will be described in detail with reference to FIGS. 3 to 11D.

Figure 1:
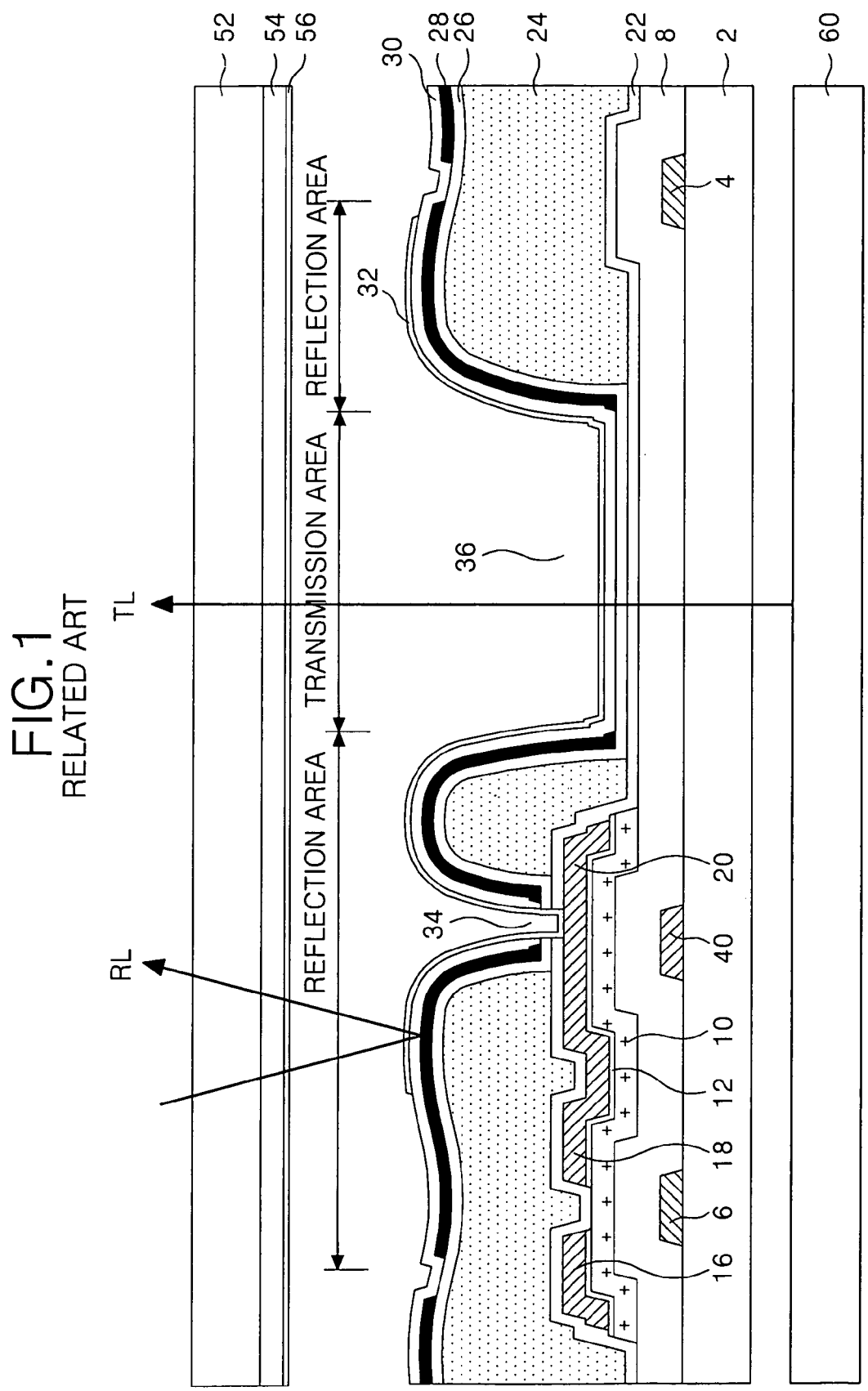
FIG. 1 is a sectional view illustrating a portion of a related art transflective liquid crystal display panel.
Figure 2A:
FIGS. 2A to 2F are sectional views explaining sequentially a fabricating method of the transflective thin film transistor substrate shown in FIG. 1.
Figure 2B:
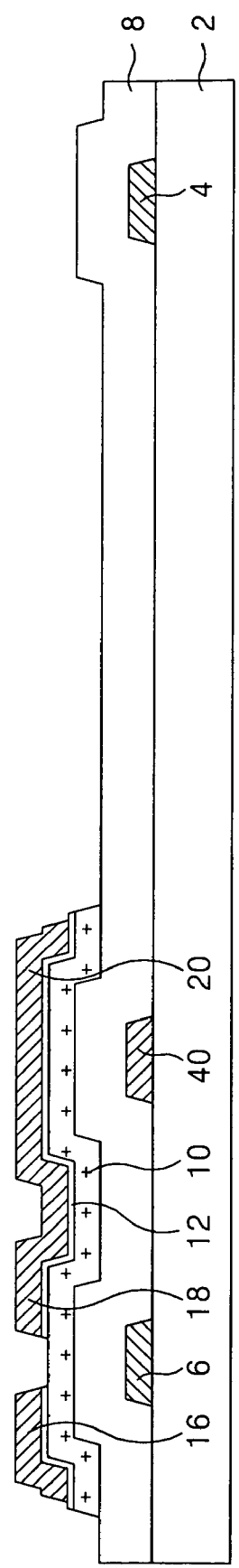
Figure 2C:
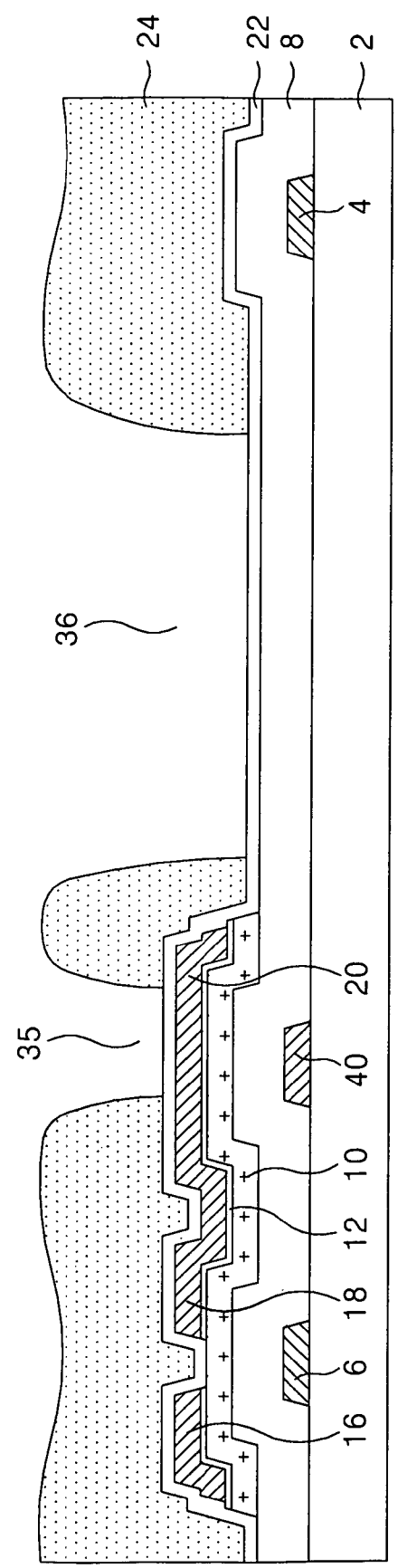
Figure 2D:
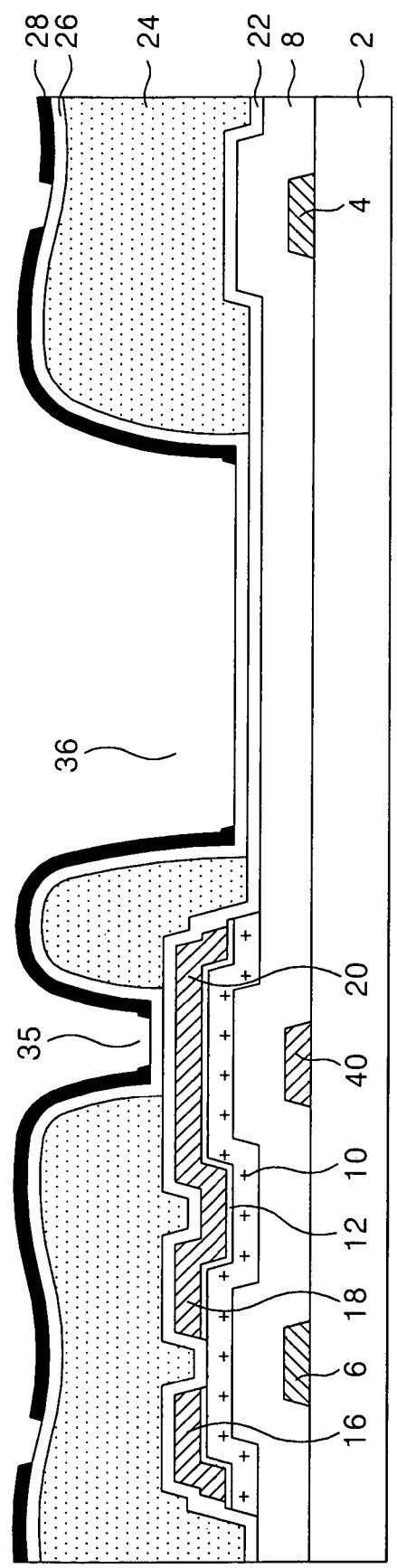
Figure 2E:
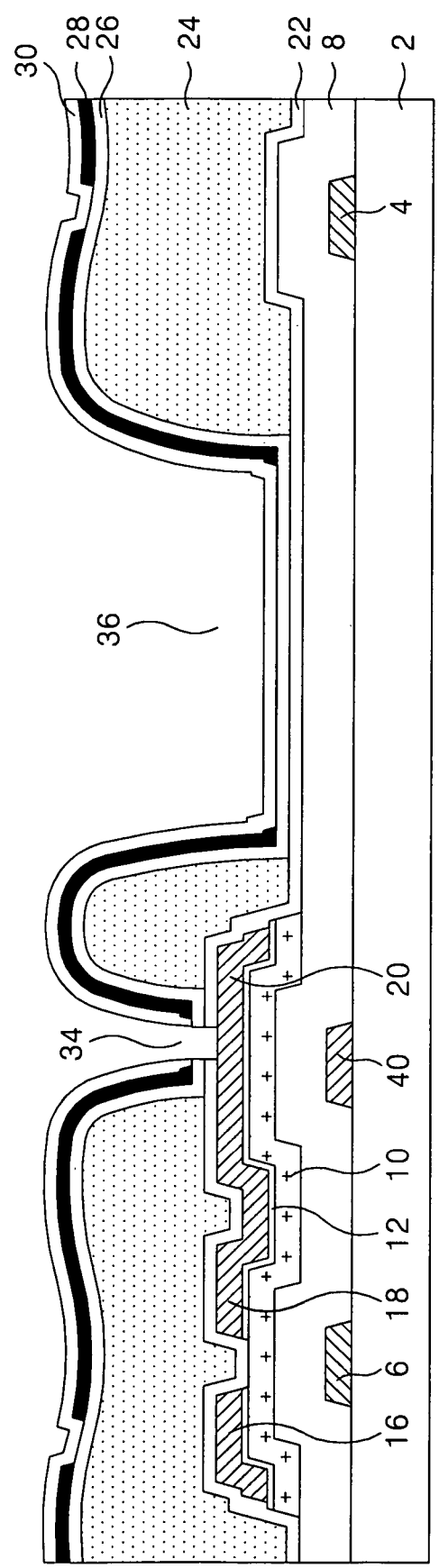
Figure 2F:
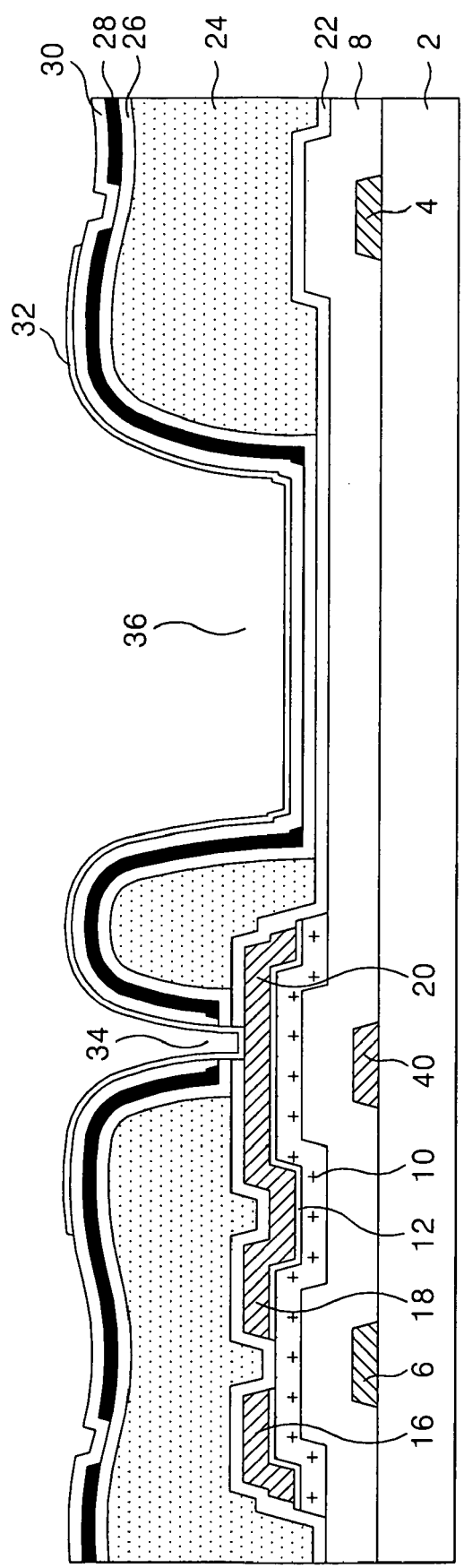
Figure 3:
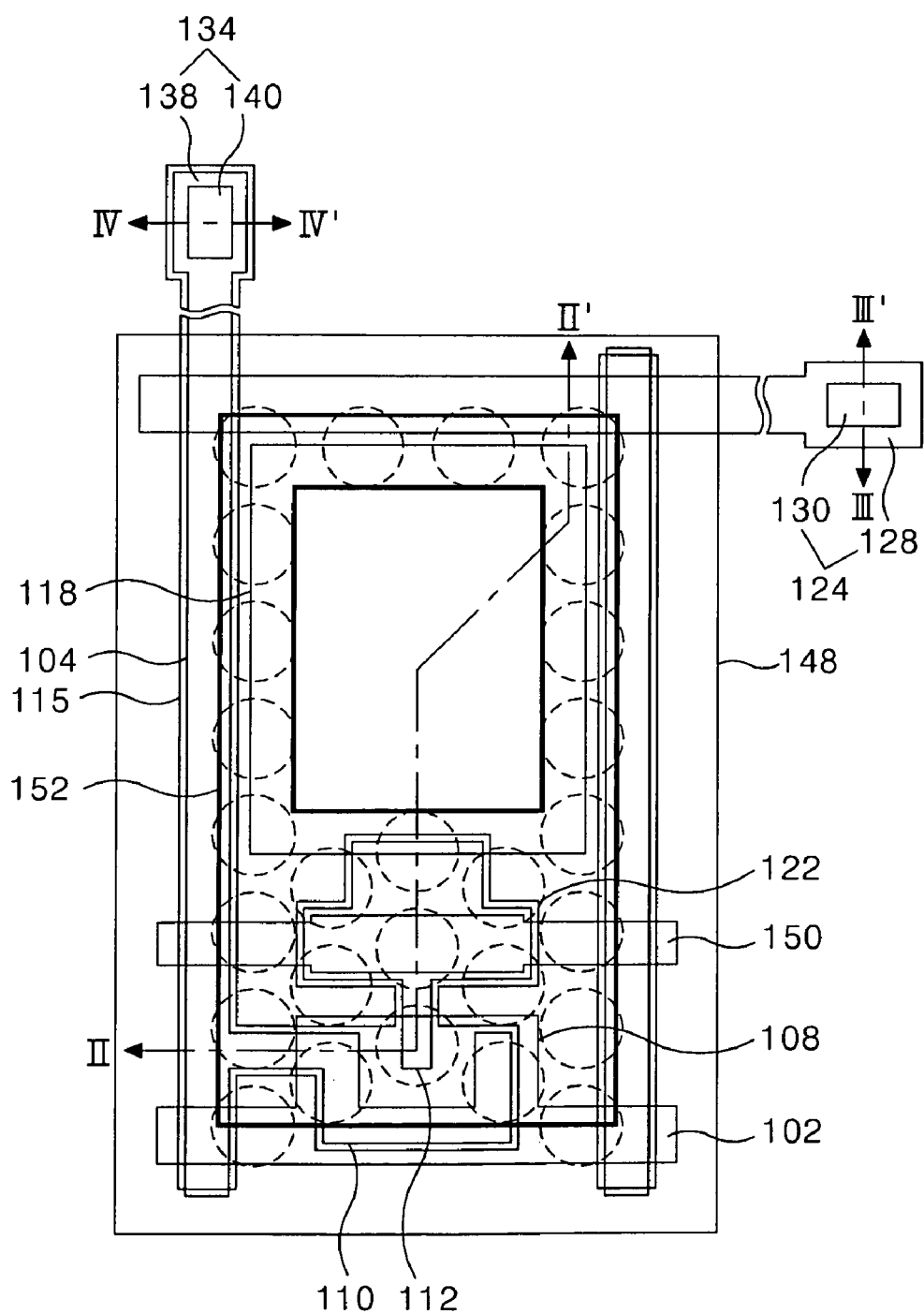
FIG. 3 is a plane view partially illustrating a transflective thin film transistor substrate according to an embodiment of the present invention.
Figure 4:
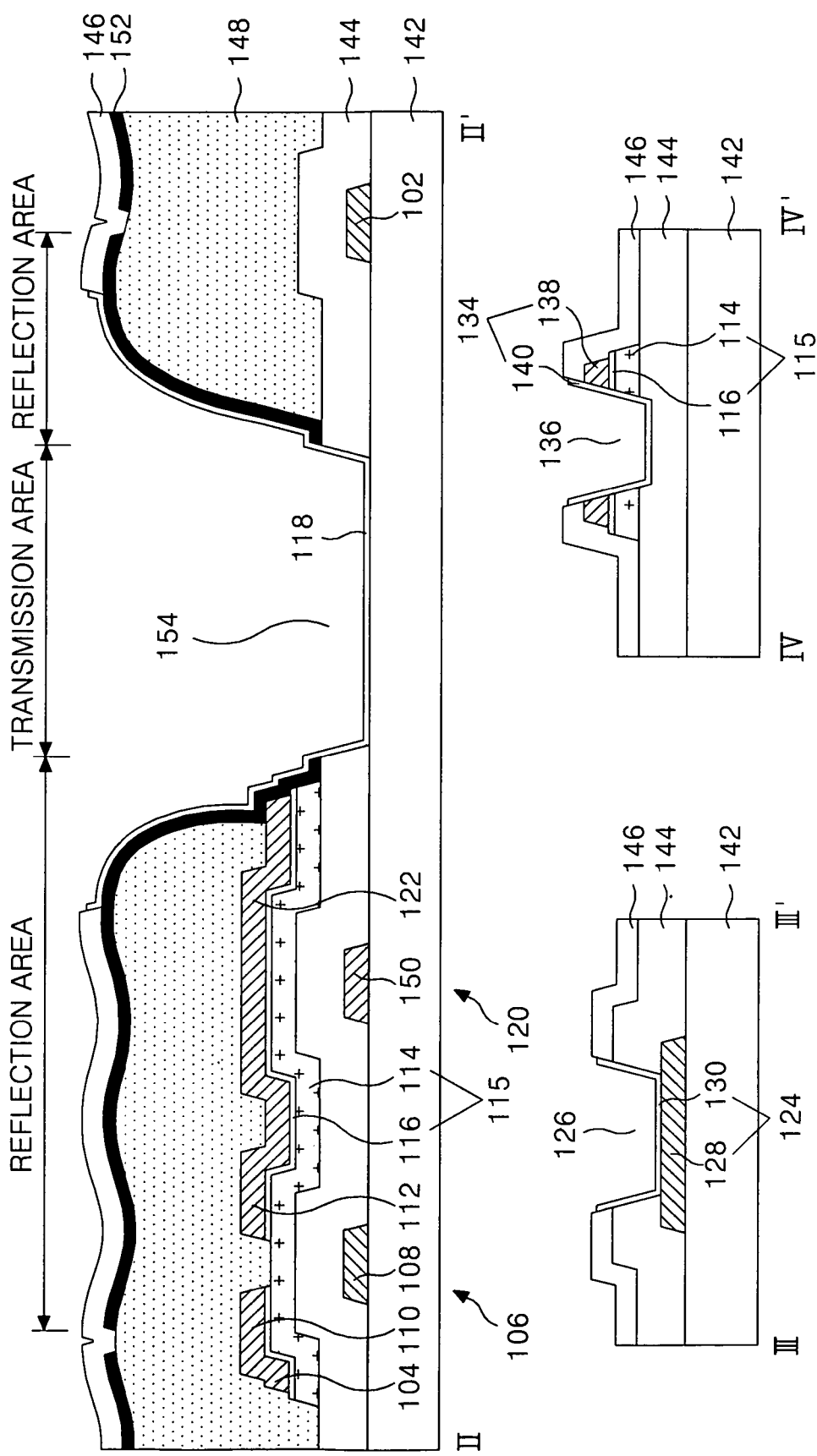
FIG. 4 is a sectional view illustrating the transflective thin film transistor substrate taken along lines II-II', III-III, IV-IV' of FIG. 3.

FIG. 3 is a plane view partially illustrating a transflective thin film transistor substrate according to an embodiment of the present invention, and FIG. 4 is a sectional view illustrating the transflective thin film transistor substrate taken along lines II-II', III-III, IV-IV' of FIG. 3.

As shown in FIGS. 3 and 4, the transflective thin film transistor substrate includes a lower substrate 142; a gate line 102 and a data line 104 that define a pixel area on the lower substrate 142 crossing each other with a gate insulating film 144 therebetween; a thin film transistor 106 connected to the gate line 102 and the data line 104; a reflection electrode 152 formed at a reflection area of each pixel; and a pixel electrode 118 formed at each pixel area and connected to the thin film transistor 106 through the reflection electrode 152 and an upper storage electrode 122. The transflective thin film transistor substrate includes a storage capacitor 120 formed by overlapping a storage line 150 with the upper storage electrode 122 connected to the pixel electrode 118 via the reflection electrode 152; a gate pad 124 connected to the gate line 102; and a data pad 134 connected to the data line 104. The transflective thin film transistor substrate divides each pixel area into a reflection area where the reflection electrode 152 is formed and a transmission area where the reflection electrode 152 is not formed.

The thin film transistor 106 includes a gate electrode 108 connected to the gate line 102; a source electrode 110 connected to the data line 104; a drain electrode 112 facing the source electrode 110 to be connected to the pixel electrode 118; an active layer 114 overlapping the gate electrode 108 with a gate insulating film 144 therebetween to form a channel between the source electrode 110 and the drain electrodes 112; and an ohmic contact layer 116 formed on the active layer 114 except for a channel portion to make an ohmic contact with the source electrode 110 and the drain electrode 112. The thin film transistor 106 responds to the scan signal of the gate line 102 to cause a video signal on the data line 104 to be charged and maintained in the pixel electrode 118. A semiconductor pattern 115 including the active layer 114 and the ohmic contact layer 116 is formed to overlap the data line 104 as well.

The reflection electrode 152 is formed at the reflection area of each pixel to reflect an external light. The reflection electrode 152 has the embossing shape in accordance with the shape of the organic film 148, thereby increasing its reflection efficiency due to its dispersion effect. Further, the reflection electrode 152 is connected via a transmission hole 150 penetrating the organic film 148 to a side surface of the upper storage electrode 122.

The transmission hole 154 is formed at the transmission area to penetrate a gate insulating film 144, the organic film 148, the reflection electrode 152, and the passivation film 146.

Accordingly, the length of the light path that runs through the liquid crystal layer becomes the same at the reflection area and the transmission area. Thus, the transmission efficiency of the reflection mode and the transmission mode becomes the same. As the transmission hole goes from the gate insulating film 144 to the passivation film 146, its width becomes wider. Accordingly, the reflection electrode 152 formed at a reflection area is practically exposed.

The pixel electrode 118 independently formed at each pixel area overlapping with a partial portion of the reflection electrode 152 exposed through the transmission hole 154 and is connected. Accordingly, the pixel electrode 118 is connected to the reflection electrode 152 of the pixel electrode 118, and to the drain electrode 112 of the thin film transistor 106 via the upper storage electrode 122 connected to the reflection electrode 152. The pixel electrode 118 generates a potential difference with a common electrode of a color filter (not shown) by a pixel signal supplied through the thin film transistor. The potential difference causes liquid crystal molecules having dielectric anisotropy to rotate, thereby controlling the transmissivity of the light that runs through a liquid crystal layer in each of the reflection area and the transmission area. Thus, its brightness is changed in accordance with the video signal. Herein, an opening portion of the passivation film 146 overlaps with a partial transmission hole 154 and a partial reflection electrode 152 adjacent to the transmission hole 154. Further, the passivation film 146 forms a boundary from the pixel electrode 118.

The storage line 150 adjacent to the gate line 102 and crossing the data line 104 overlaps the upper storage electrode 122 connected to the pixel electrode 118 with the gate insulating film 144 therebetween, thereby forming the storage capacitor 120. The upper storage electrode 122 is integrated with the drain electrode 112, and is connected to the pixel electrode 118 through the reflection electrode 152. The upper storage electrode 112 further overlaps the semiconductor pattern 115 under the upper storage electrode 122.

The gate line 102 is connected to a gate driver (not shown) through the gate pad 124. The gate pad 124 includes a lower gate pad electrode 128 extended from the gate line 102; and an upper gate pad electrode 130 connected to the lower gate pad electrode 128 via a contact hole 126 penetrating through the passivation film 146 and the gate insulating film 144.

The data line 104 is connected to a data driver (not shown) through the data pad 134. The data pad 134 includes a lower data pad electrode 138 extended from the data line 104; and an upper data pad electrode 130 connected to a side surface of the lower data pad electrode 138 via a second contact hole 136 penetrating the passivation film 146, the lower data pad electrode 138, and the semiconductor pattern 115.

In the transflective thin film transistor substrate having the above structure, a transparent conductive pattern including the pixel electrode 118, the upper gate pad electrode 130, and the upper data pad electrode 140 is formed by the same patterning process of the transparent conductive layer. In this case, the transparent conductive layer is patterned by the lift-off process removing the photoresist pattern used in forming the transmission hole 154, the first hole 126, and the second contact hole 136. The transmission hole 154, the first hole 126, and the second contact hole 136 penetrate from passivation film 146 to the gate insulating film 144 in the previous process. Accordingly, the transparent conductive pattern forms a boundary from an edge portion of the passivation film 146.

Figure 5A:
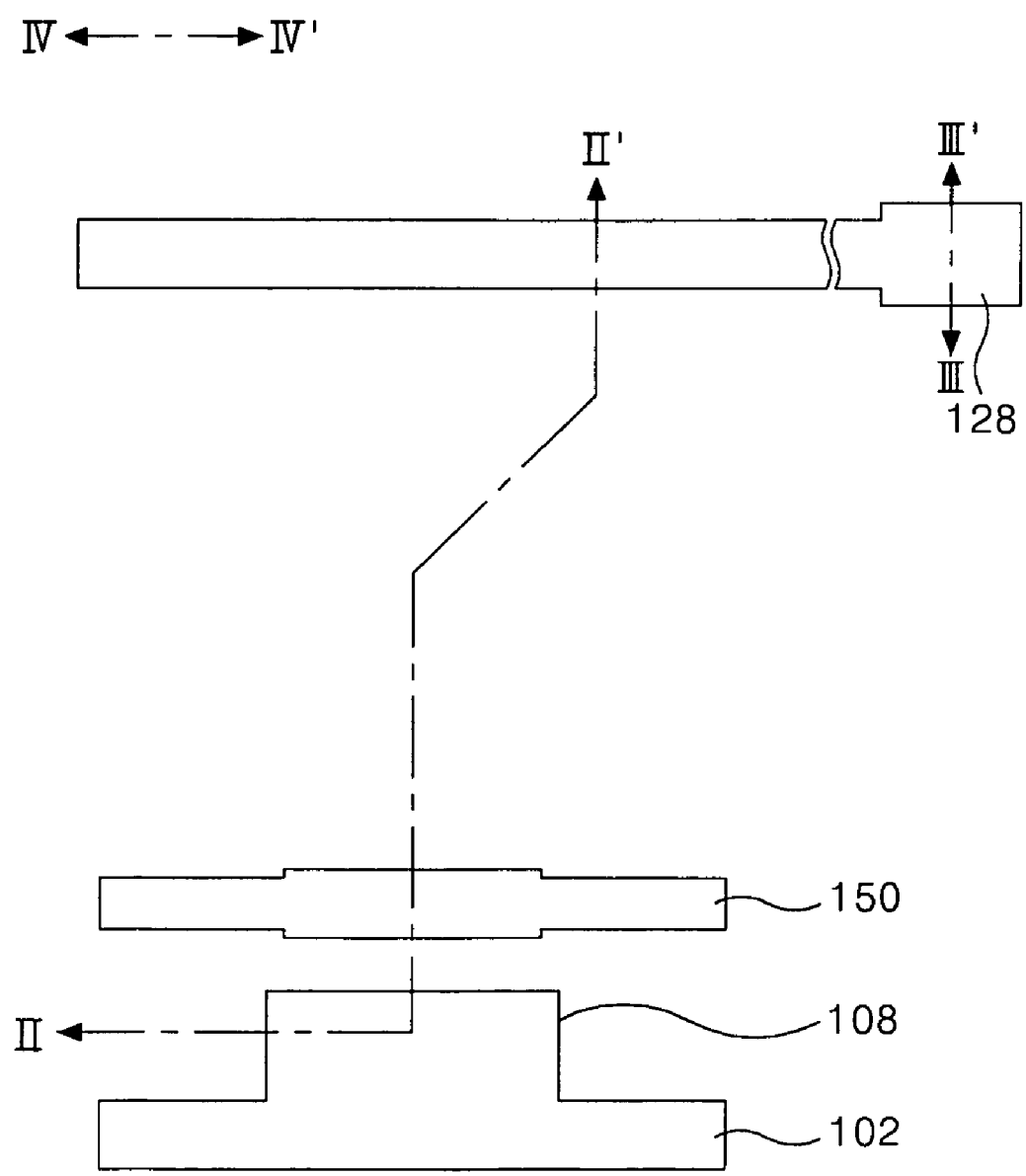

As a result, the transflective thin film transistor substrate according to the embodiment of the present invention is formed by the following five mask processes. FIGS. 5A and 5B are a plane view and a sectional view explaining a first mask process in a fabricating method of the transflective thin film transistor substrate according to the embodiment of the present invention.

A gate pattern is formed by a first mask process where the gate pattern includes the gate line 102, the gate electrode 108 connected to the gate line 102, the lower gate pad electrode 128, and the storage line 150 on the lower substrate 142. More particularly, the gate metal layer is formed on the lower substrate by a deposition method such as sputtering. The gate metal layer is patterned by a photolithography process using a first mask and an etching process, thereby forming the gate pattern that includes the gate line 102, the gate electrode 108, the lower gate pad electrode 128, and the storage line 150. The gate metal layer is formed of a metal material such as Mo, Cu, Al(Nd), Cr, Ti, MoW, Ta or the like. Further, the gate metal layer can be formed with a double layer having a first conductive layer and a second conductive layer, wherein the first conductive layer is formed of ITO, TO, IZO or the like and the second conductive layer is formed of a metal material as mentioned above.

Figure 6A:
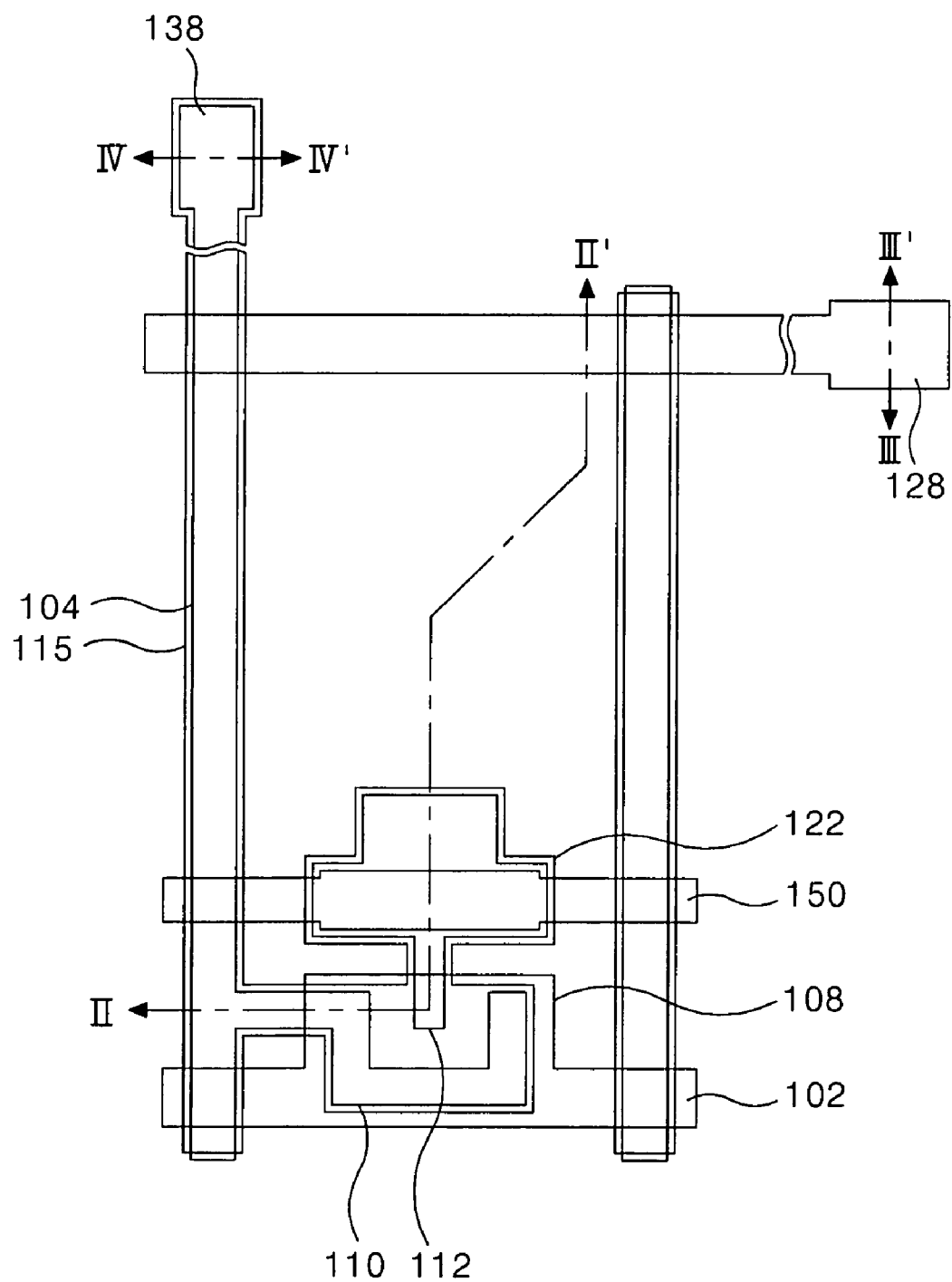
FIGS. 6A and 6B are a plane view and a sectional view describing a second mask process of the transflective thin film transistor substrate according to the present invention.
Figure 6B:
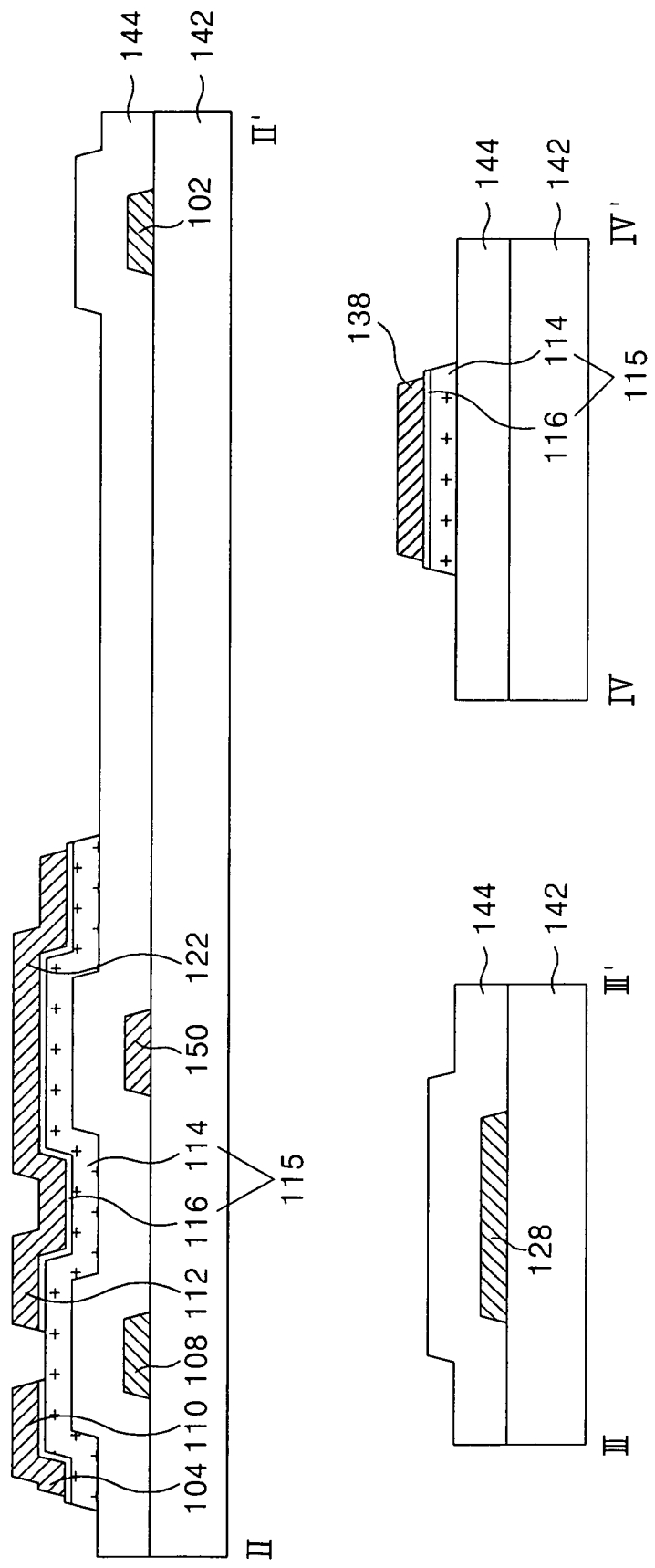

FIGS. 6A and 6B are a plane view and a sectional view explaining a second mask process in a fabricating method of the transflective thin film transistor substrate according to the present invention. FIGS. 7A to 7E are sectional views specifically explaining the second mask process.

The gate insulating film 144 is formed on the lower substrate 142 where the gate pattern is formed. A source/drain pattern including the data line 104, the source electrode 110, the drain electrode 112, the upper storage electrode 122 and the lower data pad electrode 138, a semiconductor pattern 115 including the active layer 114 and the ohmic contact layer 116 that overlap along the rear surface of the source/drain pattern are formed on top thereof by a second mask process. The semiconductor pattern 115 and the source/drain pattern are formed by a one mask process using a diffractive exposure mask.

Specifically, the gate insulating film 144, an amorphous silicon layer 105, an amorphous silicon layer 107 doped with impurities n+ or p+, a source/drain metal layer 109 are sequentially formed on the lower substrate 142 where the gate pattern is formed as in FIG. 7A. For example, the gate insulating film 144, the amorphous silicon layer 105, the amorphous silicon layer 107 doped with impurities are formed by PECVD, and the source/drain metal layer 109 is formed by sputtering. The gate insulating film 144 is formed of inorganic insulating material such as silicon oxide SiOx, silicon nitride SiNx and like. The source/drain metal layer 109 is formed of metal material such as Mo, Cu, Al(Nd), Cr, Ti, MoW, Ta or the like.

A photoresist 219 is spread over the source/drain metal layer 109, and then the photoresist 219 is exposed and developed by a photolithography process using a diffractive exposure mask 210, thereby forming a photoresist pattern 220 having the stepped difference as shown in FIG. 7B. The diffractive exposure mask 210 includes a transparent quartz substrate 212, a shielding layer 214 on top of the substrate 212 formed of a metal layer such as Cr and CrOx and the like, and a diffractive exposure slit 216. The shielding layer 214 is located at an area where the semiconductor pattern and the source/drain pattern are to be formed to intercept ultraviolet ray, thereby leaving a first photoresist pattern 220A after development. The diffractive exposure slit 216 is located at an area where the channel of the thin film transistor is to be formed to diffract the ultraviolet ray, thereby remaining a second photoresist pattern 220B that is thinner than the first photoresist pattern 220A after development.

Subsequently, the source/drain metal layer 109 is patterned by the etching process using the photoresist pattern 220 having a stepped difference, thereby forming the source/drain pattern and the semiconductor pattern 115 thereunder as shown in FIG. 7C. In this case, the source electrode 110 and the drain electrode 112 in the source/drain pattern have a structure where they are integrated.

Then, the photoresist pattern 220 is ashed by an ashing process using an oxygen $O_2$ plasma. Thus, the first photoresist pattern 220A becomes thinner and the second photoresist pattern 220B is removed as shown in FIG. 7D. The source/drain pattern exposed by the removal of the second photoresist pattern 220B and the ohmic contact layer 116 thereunder are eliminated by the etching process using the ashed first photoresist pattern 220A, thereby separating the source electrode 110 from the drain electrode 112 and exposing the active layer 114. Accordingly, a channel of the active layer 114 is formed between the source electrode 110 and the drain electrode 112. At this moment, both sides of the source/drain pattern are etched once more along the ashed first photoresist pattern 220A, thus the source/drain pattern and the semiconductor pattern 115 have a fixed stepped difference in a step shape.

Figure 7E:
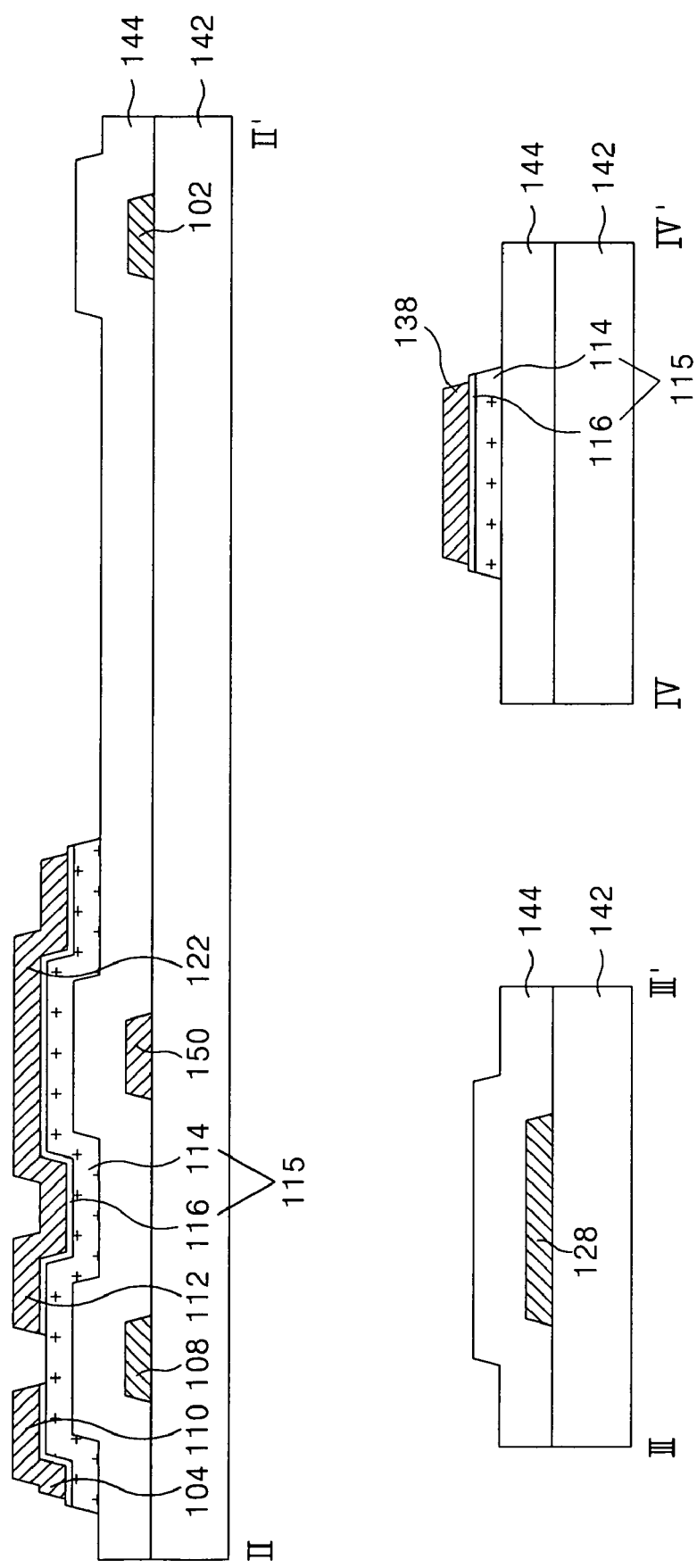

Then, the first photoresist pattern 220A remaining on the source/drain pattern is removed by a strip process as in FIG. 7E.

Figure 8A:
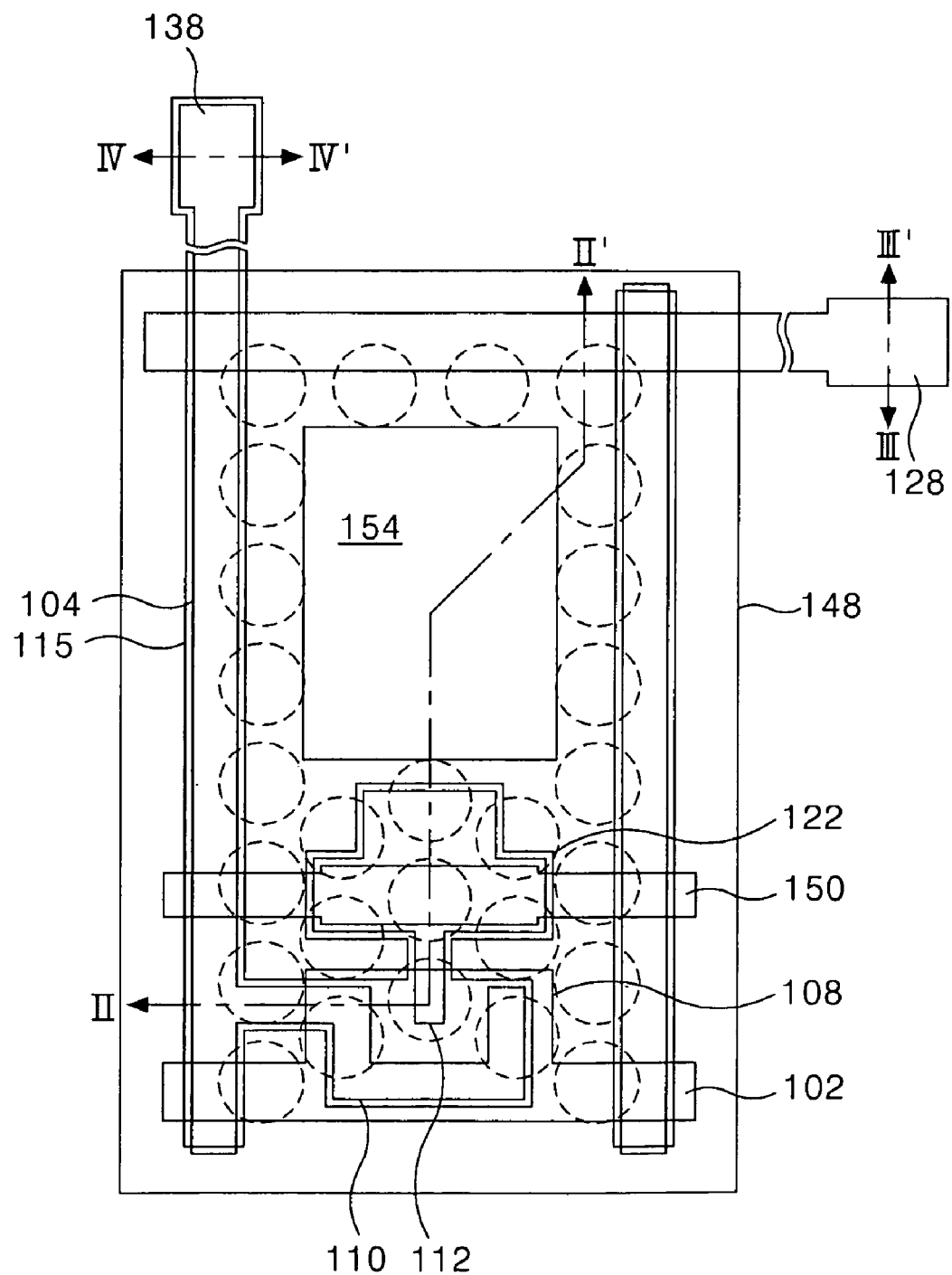
FIGS. 8A and 8B are a plane view and a sectional view describing a third mask process of the transflective thin film transistor substrate according to the present invention.
Figure 8B:
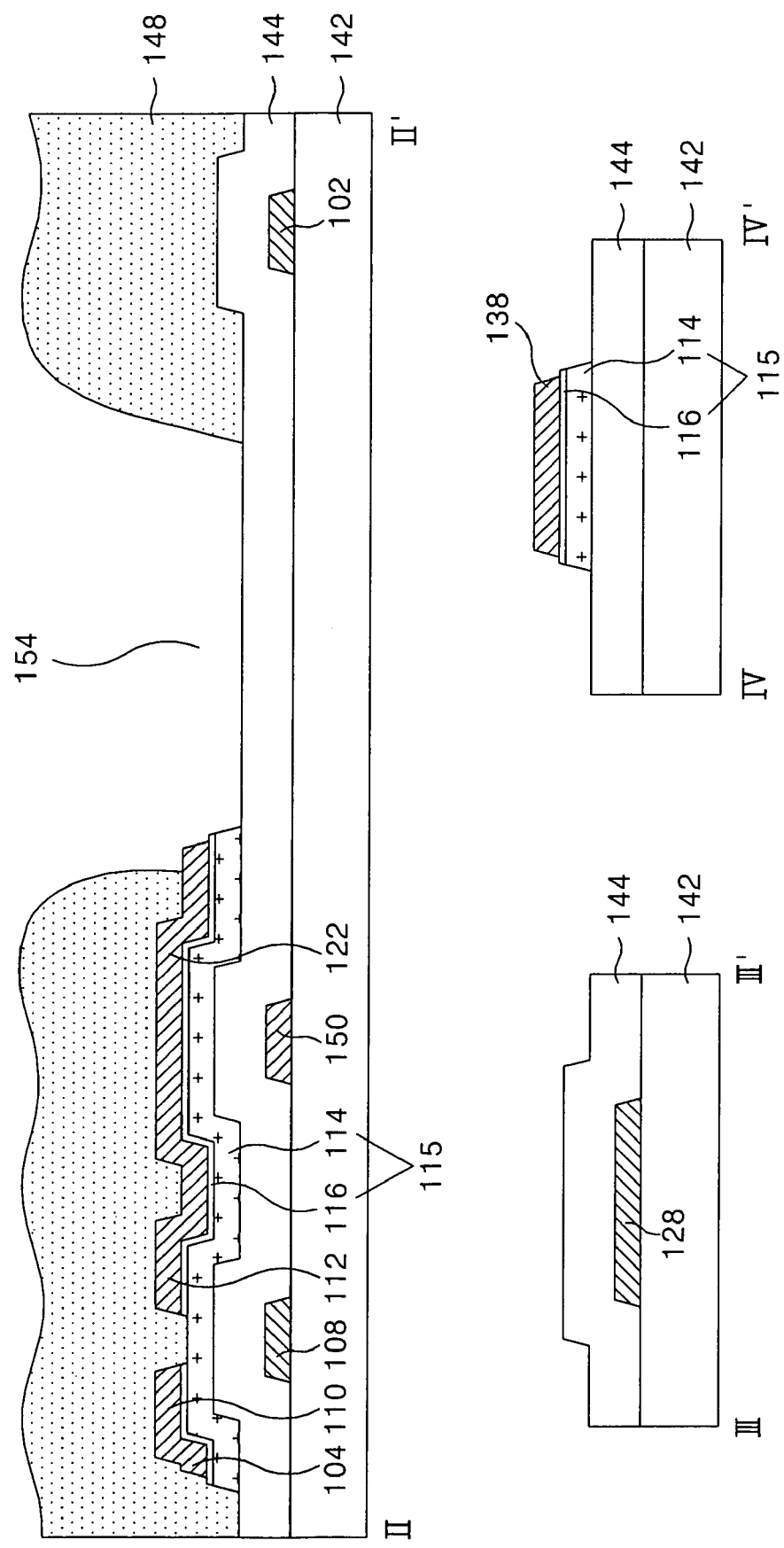

FIGS. 8A and 8B are a plane view and a sectional view explaining a third mask process in a fabricating method of the transflective thin film transistor substrate according to the present invention.

On the gate insulating film 144 having the source/drain pattern formed by the third mask process, the transmission hole 154 is formed at the transmission area and the organic film 148 (having an embossing surface at the reflection area) removed at the pad area is formed. Specifically, the organic film 148 is formed on the gate insulating film 144 having the source/drain pattern by spin coating. The organic film 148 is formed of a photosensitive organic material such as acrylic resin. Then, the organic film 148 is patterned by the photolithography process using the third mask, that is, a half tone mask or a diffractive exposure mask. Thus the transmission hole 155 penetrating the organic film 148 is formed in the transmission area in correspondence to the transmission portion of the third mask, and the organic film 148 is removed at the pad area. Further, the remaining portion except for the transmission portion in the third mask has a structure that the shielding portion and the diffractive exposure portion (or transflective portion) are repeated. In correspondence thereto, the organic film 148 is patterned to have a structure where the shielding area (projected portion) and the diffractive exposure area (groove portion) having the stepped difference are repeated in the reflection area. Subsequently, the organic film 148 with the repeated projected portion and groove portion is cured to form the embossing shape on the surface of the organic film 148.

Figure 9A:
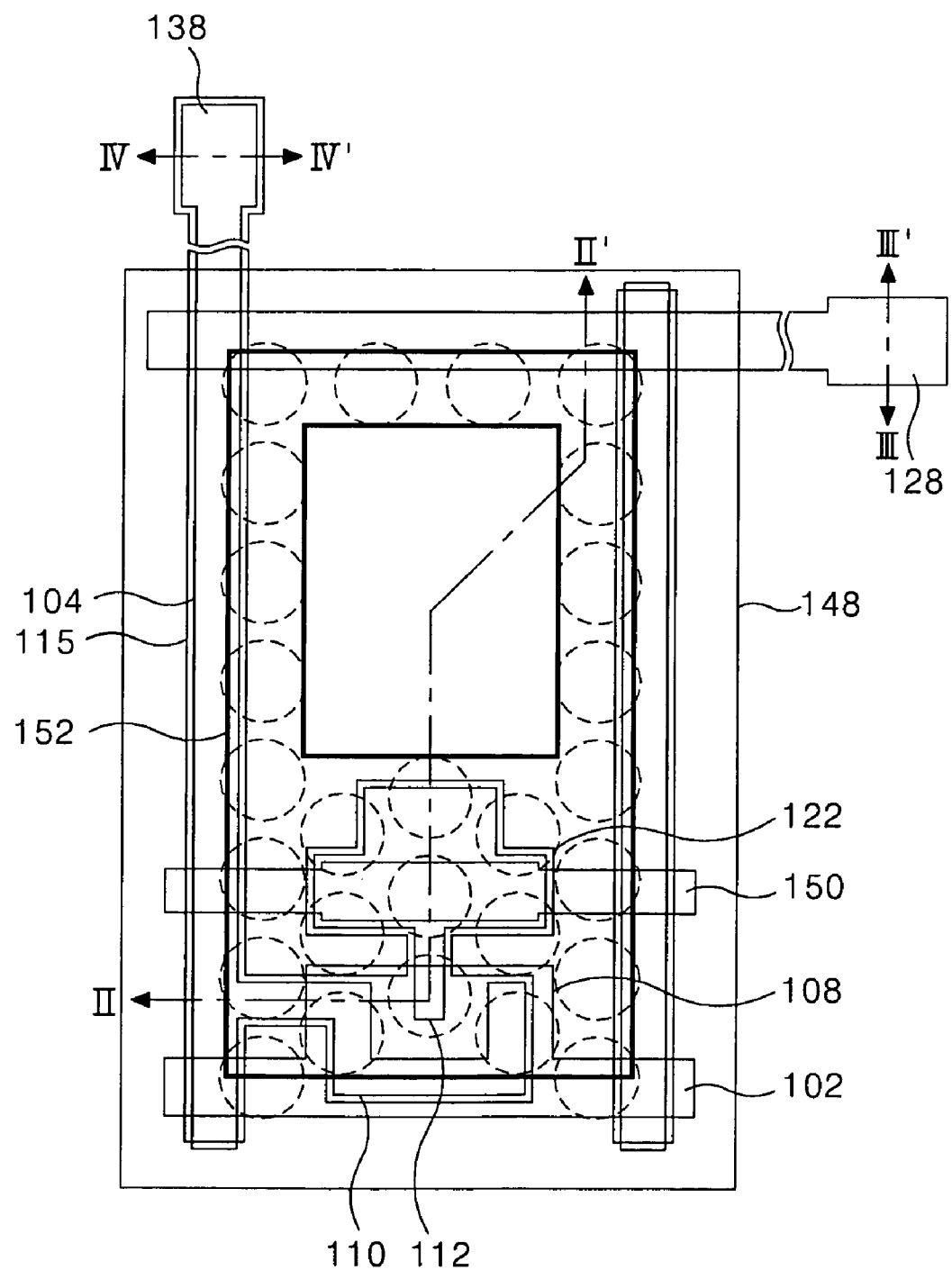

FIGS. 9A and 9B are a plane view and a sectional view explaining a fourth mask process in a fabricating method of the transflective thin film transistor substrate according to the present invention.

The reflection electrode 152 is formed at each pixel reflection area by the fourth mask process. Specifically, a reflective metal layer having an embossing surface is formed on the organic film 148 and maintains the embossing shape. The reflective metal layer is formed of a metal that has a high reflectivity like AlNd. Subsequently, the reflective metal layer is patterned by a photolithography process using the fourth mask and the etching process, thereby independently forming the reflection electrode 152 at every reflection area of each pixel. The reflection electrode 152 is connected to the drain electrode 112 via a side surface of the upper storage electrode 122 exposed at the edge portion of the transmission hole 154.

Figure 10A:
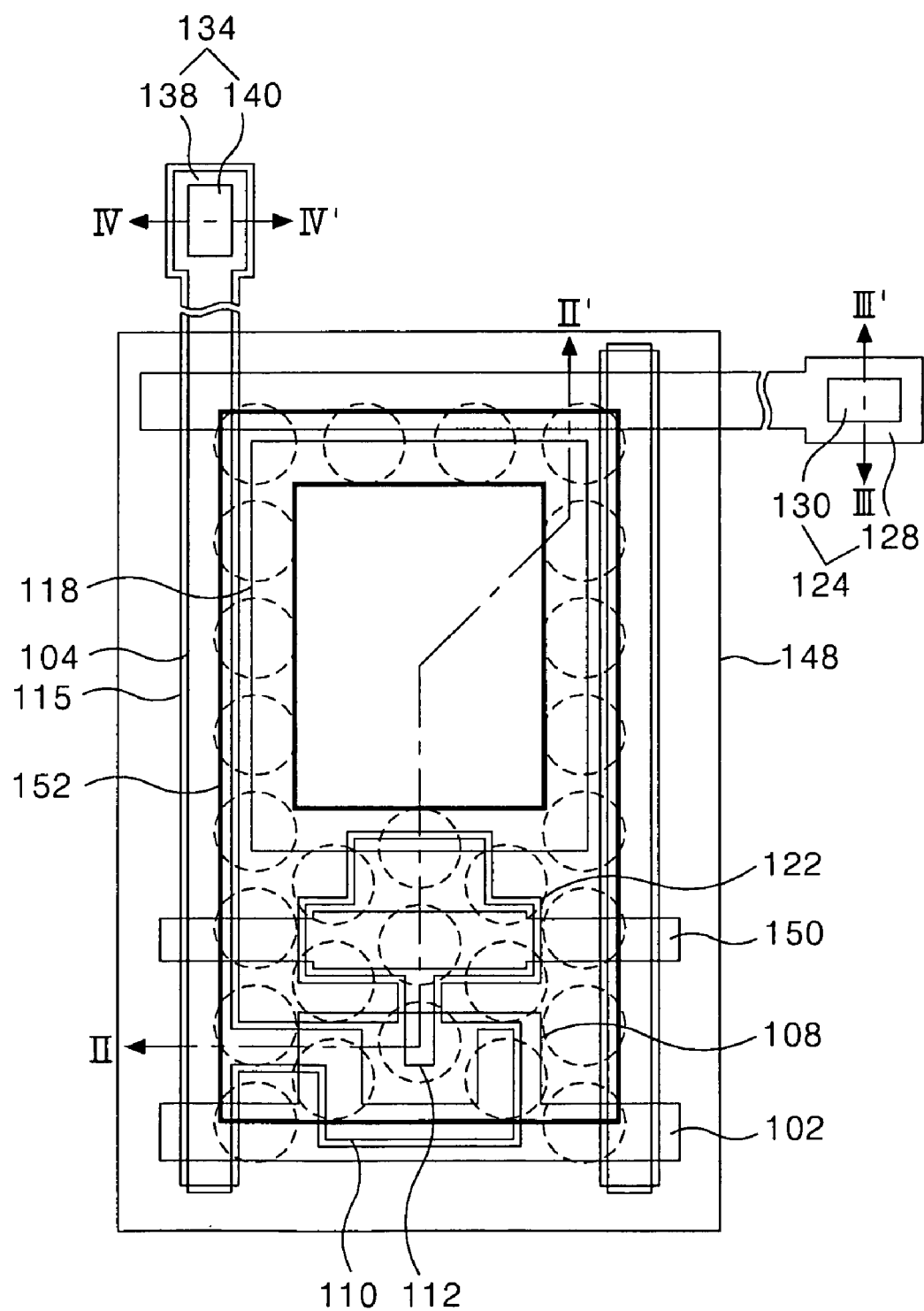

FIGS. 10A and 10B are a plane view and a sectional view explaining a fifth mask process in a fabricating method of the transflective thin film transistor substrate according to of the present invention, FIGS. 11A and 11D are sectional views to specifically describe the fifth mask process of the present invention.

In the fifth mask process, the transmission hole 154 penetrates from the passivation film 146 through the gate insulating film 144; the first and the second contact holes 126 and 136 exposing the lower gate pad electrode 128 and the lower data pad electrode 138 are formed; and a transparent conductive pattern including the pixel electrode 118, the upper gate pad electrode 130 and the upper data pad electrode 140 is formed.

Specifically, as shown in FIG. 11A, the passivation film 146 covering the reflection electrode 152 is formed by the deposition method such as PECVD. A photoresist pattern 230 is formed on the passivation film 146 by a photolithography process. The passivation film 146 is of an inorganic insulating material like that used for the gate insulating film 144. The photoresist pattern 230 has an opened structure at the area having the transmission hole 154, the lower gate pad electrode 128 and the lower data pad electrode 138.

Figure 11B:
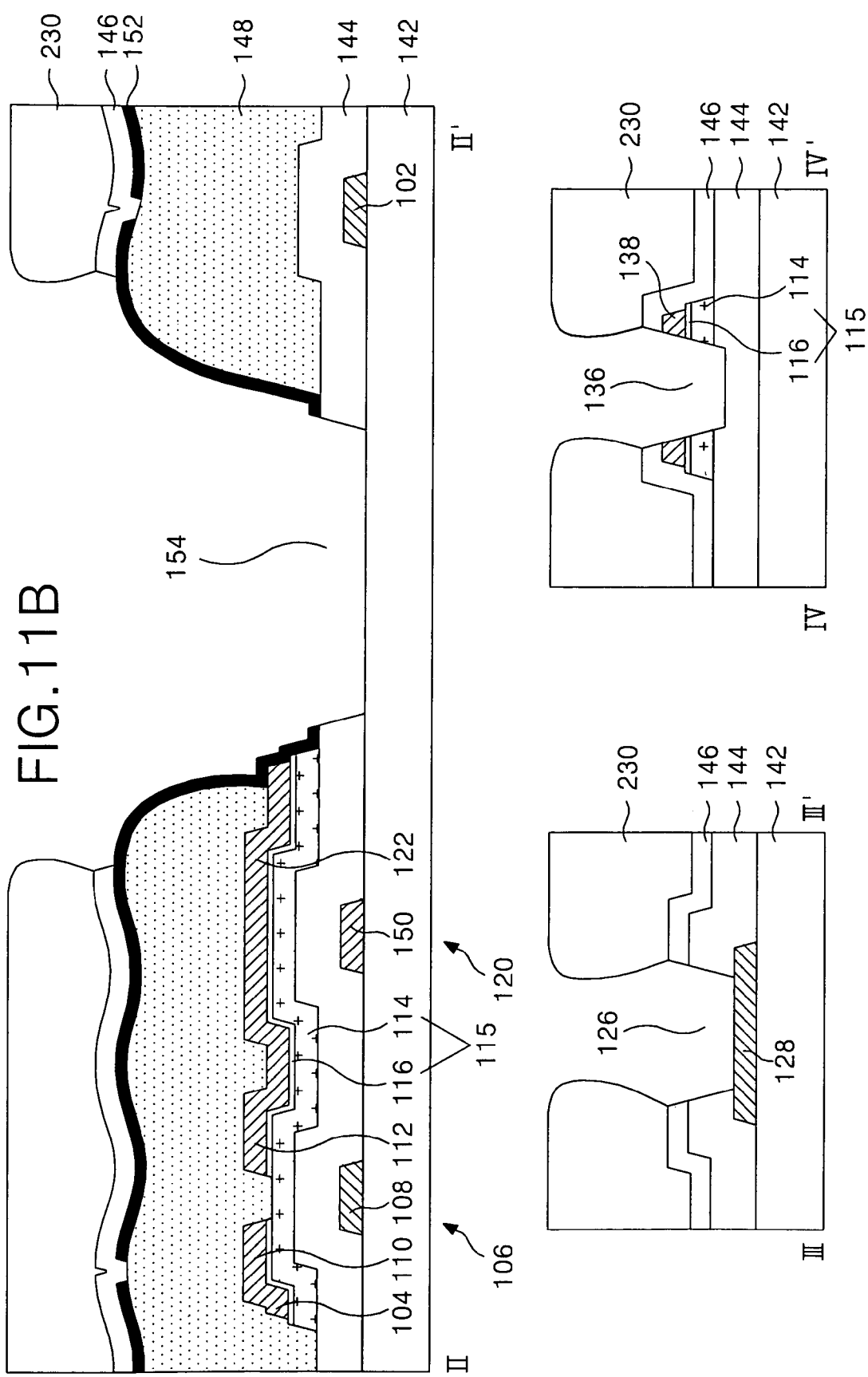
FIGS. 11A and 11D are sectional views describing the fifth mask process of the present invention.

The passivation film 146 and the gate insulating film 144 are patterned by the etching process using the above photoresist pattern 230 so that the transmission hole 154 penetrates the passivation film 150 and the gate insulating film 144 as shown in FIG. 11B, and the first and the second contact holes 126 and 136 exposing the lower gate pad electrode 128 and the lower data pad electrode 138 are formed. The transmission hole 154 exposes a partial reflection electrode 152. The first contact hole 126 penetrates the passivation film 146 and the gate insulating film 144 to expose the lower gate pad electrode 128. The second contact hole 136 penetrates the passivation film 146, the lower data pad electrode 138 and the semiconductor pattern 115 to expose a side surface of the lower data pad electrode 138. In this case, the edge part of the photoresist pattern 230 has more projected shape than the edge part of the passivation film 146 due to the over-etched passivation film 146. The ashing process and the etching process are continually performed in the same chamber.

Subsequently, a transparent conductive film 117 is entirely on the thin film transistor substrate having the photoresist pattern 230 by a deposition method such as sputtering. The transparent conductive film 117 is formed of ITO, TO, IZO or the like. At this time, the transparent conductive film 117 deposited having a straight property by the edge portion of the projected photoresist pattern 230 is opened at the edge portion of the passivation film 146 to form a stripper osmosis path.

The photoresist pattern 230 and the transparent conductive film 117 on the photoresist pattern 230 are removed together by the lift-off process, thereby forming the transparent conductive pattern including the pixel electrode 118, the upper gate pad electrode 132 and the upper data pad electrode 140, as shown in FIG. 11D. At this time, because the stripper is easily passed into the edge part of the passivation film 146 via the osmosis path formed by open of the transparent conductive film 117, lift-off efficiency can be improved. The pixel electrode 118 forms a boundary from the passivation film 146 in the transmission hole 154. The pixel electrode 118 is connected to the exposed reflection electrode 152. The upper gate pad electrode 130 forms a boundary from the passivation film 146 in the first contact hole 126 to connected to the lower gate pad electrode 128. The upper data pad electrode 140 forms a boundary from the passivation film 146 in the second contact hole 136 to connected to a side surface of the lower data pad electrode 138.

As described above, in the transflective thin film transistor substrate and the method of driving the same, the transparent conductive pattern is formed by the lift-off process of the photoresist pattern used in forming the transmission hole and the contact hole that penetrate the passivation film and the gate insulating film, thereby simplifying the processes by performing a five mask process.

It will be apparent to those skilled in the art that various modifications and variations can be made in the liquid crystal display device and fabricating method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a first substrate;
    a gate line on the first substrate;
    a first insulation film on the gate line;
    a data line crossing the gate line such that the data line and the gate line define a pixel region with a transmission area and a reflection area;
    a thin film transistor connected to the gate line and the data line;
    a storage capacitor including a storage line crossing the data line, and an upper storage electrode being connected to the thin film transistor and overlapping the storage line;
    a second insulation film on the thin film transistor, a transmission hole being defined through the second insulation film;
    a reflection electrode contacted with the first insulation film and the second insulation film without contacting with an upper surface of the first substrate exposed through the transmission hole in the reflection area and connected to a portion of the upper storage electrode through the transmission hole;
    a pixel electrode disposed in the pixel region and connected to the reflection electrode, a lower surface of the pixel electrode being directly contacted with an entire surface of the reflection electrode exposed through the transmission hole in the reflection area and an entire surface of the substrate exposed through the transmission hole in the transmission area;
    a second substrate facing the first substrate; and
    a liquid crystal layer disposed between the first and second substrates.

2. The device of claim 1, further comprising a third insulation film absent from the transmission area of the pixel region and a portion of the reflection electrode where the pixel electrode is connected to the reflection electrode.

3. The device of claim 2, wherein the pixel electrode contacts the third insulation film to define a boundary of the transmission hole.

4. The device of claim 2, further comprising a gate pad having a lower gate pad electrode and an upper gate pad electrode, the lower gate pad electrode being extended from the gate line and the upper gate pad electrode being connected to the lower gate pad electrode via a contact hole through the third insulation film and the first insulation film.

5. The device of claim 4, wherein the upper gate pad electrode abuts the third insulation film in the contact hole.

6. The device of claim 4, wherein the second insulation film in the reflection area is absent in the gate pad.

7. The device of claim 2, further comprising a data pad having a lower data pad electrode and an upper data pad electrode, the lower data pad electrode being extended from the data line and the upper data pad electrode connected to the lower data pad electrode via a contact hole through the third insulation film and the lower data pad electrode.

8. The device of claim 7, wherein the upper data pad electrode abuts the third insulation film in the contact hole.

9. The device of claim 7, wherein the second insulation film in the reflection area is absent in the data pad.

10. The device of claim 7, wherein the upper data pad electrode is laterally connected to the lower data pad electrode.

11. The device of claim 1, wherein the transmission hole is further defined to pass through the first insulation film in the transmission area.

12. The device of claim 1, wherein the second insulation film has an embossing surface in the reflection area.

13. The device of claim 1, wherein the second insulation film includes an organic material.

* * * * *